United States Patent
Hochwarth et al.

(10) Patent No.: US 10,991,255 B2
(45) Date of Patent: Apr. 27, 2021

(54) PROVIDING AN OPEN INTERFACE TO A FLIGHT MANAGEMENT SYSTEM

(71) Applicant: GE Aviation Systems LLC, Grand Rapids, MI (US)

(72) Inventors: Joachim Karl Ulf Hochwarth, Caledonia, MI (US); Kevin John Jones, Grand Rapids, MI (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 0 days.

(21) Appl. No.: 16/229,185

(22) Filed: Dec. 21, 2018

(65) Prior Publication Data

US 2019/0311632 A1    Oct. 10, 2019

Related U.S. Application Data

(60) Provisional application No. 62/653,049, filed on Apr. 5, 2018.

(51) Int. Cl.
*G08G 5/00* (2006.01)
*G06F 16/953* (2019.01)
*G06F 8/30* (2018.01)

(52) U.S. Cl.
CPC .......... *G08G 5/0021* (2013.01); *G06F 8/30* (2013.01); *G06F 16/953* (2019.01); *G08G 5/0013* (2013.01); *G08G 5/0039* (2013.01)

(58) Field of Classification Search
CPC ....... G06F 16/953; G06F 8/30; G08G 5/0013; G08G 5/0021; G08G 5/0039
See application file for complete search history.

(56) References Cited

U.S. PATENT DOCUMENTS

| 6,801,769 B1 | 10/2004 | Royalty |
| 6,816,728 B2 | 11/2004 | Igloi et al. |
| 6,915,189 B2 | 7/2005 | Igloi et al. |

(Continued)

FOREIGN PATENT DOCUMENTS

| EP | 1 945 510 B1 | 12/2012 |
| EP | 2 575 120 A1 | 4/2013 |

(Continued)

OTHER PUBLICATIONS

Extended European Search Report received for EP Patent Application Serial No. 19167441.5 dated Sep. 16, 2019, 7 pages.

(Continued)

*Primary Examiner* — Babar Sarwar
(74) *Attorney, Agent, or Firm* — Amin, Turocy & Watson, LLP

(57) ABSTRACT

Providing an open interface to a navigation system is provided herein. A single partition (or more than one partition) of a partitioned operating system can be utilized to provide connectivity between a navigation system and one or more user equipment devices. Thus, the navigation system and the one or more user equipment devices can be communicatively coupled via the at least one partition. Further, a Software Development Kit (SDK) can be configured to enable bi-directional communication between the navigation system and the one or more user equipment devices. In addition, the SDK can provide security for the navigation system when communicating with the one or more user equipment devices.

20 Claims, 10 Drawing Sheets

(56) References Cited

U.S. PATENT DOCUMENTS

| | | | |
|---|---|---|---|
| 7,133,598 B1* | 11/2006 | Lin | G11B 27/034 386/232 |
| 7,177,731 B2 | 2/2007 | Sandell et al. | |
| 7,437,225 B1* | 10/2008 | Rathinam | G08G 5/0013 340/961 |
| 7,529,603 B2 | 5/2009 | Allen et al. | |
| 7,715,819 B2* | 5/2010 | Rockwell | B64D 45/0059 455/404.1 |
| 7,756,145 B2 | 7/2010 | Kettering et al. | |
| 7,769,501 B2 | 8/2010 | Lusardi et al. | |
| 7,840,770 B2 | 11/2010 | Larson et al. | |
| 7,903,594 B1 | 3/2011 | Marmur et al. | |
| 7,908,042 B2 | 3/2011 | Brinkley et al. | |
| 8,164,485 B2 | 4/2012 | Prinzel, III et al. | |
| 8,255,112 B2 | 8/2012 | Conzachi et al. | |
| 8,284,674 B2 | 10/2012 | True et al. | |
| 8,321,083 B2 | 11/2012 | Beebe et al. | |
| 8,344,912 B2 | 1/2013 | Mitchell et al. | |
| 8,364,328 B2 | 1/2013 | Hedrick | |
| 8,378,852 B2 | 2/2013 | Naimer et al. | |
| 8,462,799 B2 | 6/2013 | Molsberry et al. | |
| 8,468,263 B2 | 6/2013 | Fagan et al. | |
| 8,554,204 B2 | 10/2013 | Judd et al. | |
| 8,645,148 B2 | 2/2014 | Small et al. | |
| 8,666,648 B2 | 3/2014 | Shukla | |
| 8,791,840 B2 | 7/2014 | McGuffin et al. | |
| 8,856,508 B2 | 10/2014 | Genissel | |
| 9,003,085 B2 | 4/2015 | Saugnac | |
| 9,061,770 B2 | 6/2015 | Johnson et al. | |
| 9,087,419 B2 | 7/2015 | Lentz | |
| 9,205,916 B2 | 12/2015 | Boorman et al. | |
| 9,223,633 B2 | 12/2015 | Shuler et al. | |
| 9,269,205 B1 | 2/2016 | Lamkin et al. | |
| 9,284,045 B1 | 3/2016 | Springer et al. | |
| 9,334,063 B2 | 5/2016 | Baumgarten et al. | |
| 9,335,796 B2 | 5/2016 | Ribich | |
| 9,349,295 B2 | 5/2016 | Dorneich et al. | |
| 9,470,549 B2 | 10/2016 | Geay et al. | |
| 9,473,367 B2 | 10/2016 | Tieftrunk et al. | |
| 9,503,175 B2 | 11/2016 | Judd et al. | |
| 9,511,877 B2 | 12/2016 | Masson | |
| 9,529,356 B2 | 12/2016 | Mere et al. | |
| 9,530,318 B1 | 12/2016 | Turner et al. | |
| 9,557,189 B2 | 1/2017 | Cornell | |
| 9,583,008 B2 | 2/2017 | Marion et al. | |
| 9,626,872 B2 | 4/2017 | Judd et al. | |
| 9,626,873 B2 | 4/2017 | Mazoyer et al. | |
| 9,646,470 B1 | 5/2017 | Engels et al. | |
| 9,650,153 B2 | 5/2017 | Hathaway | |
| 9,663,242 B2 | 5/2017 | Fournier et al. | |
| 9,682,784 B1 | 6/2017 | Wiebers | |
| 9,709,982 B2 | 7/2017 | Mere et al. | |
| 9,710,145 B2 | 7/2017 | Zammit-Mangion et al. | |
| 9,714,081 B1 | 7/2017 | Hall, III et al. | |
| 9,719,799 B2 | 8/2017 | Pandit et al. | |
| 9,753,969 B2 | 9/2017 | Ceccom | |
| 9,805,606 B2 | 10/2017 | Coulmeau et al. | |
| 9,807,149 B2 | 10/2017 | Kimberly et al. | |
| 9,812,019 B2 | 11/2017 | McGuffin | |
| 9,815,569 B2 | 11/2017 | Horsager et al. | |
| 9,858,823 B1 | 1/2018 | Lynn et al. | |
| 9,858,824 B1 | 1/2018 | Zogg et al. | |
| 9,863,899 B2 | 1/2018 | Smothers | |
| 10,412,100 B2* | 9/2019 | Mitchell | H04B 7/18506 |
| 2005/0228558 A1 | 10/2005 | Valette et al. | |
| 2007/0016344 A1 | 1/2007 | Stefani | |
| 2009/0058682 A1 | 3/2009 | True | |
| 2010/0105329 A1 | 4/2010 | Durand et al. | |
| 2010/0262318 A1 | 10/2010 | Ariens | |
| 2010/0318794 A1* | 12/2010 | Dierickx | H04L 63/0861 713/164 |
| 2012/0197896 A1* | 8/2012 | Li | G06F 16/313 707/740 |
| 2013/0085672 A1* | 4/2013 | Stewart | G08G 5/003 701/528 |
| 2013/0169541 A1 | 7/2013 | Cabos et al. | |
| 2013/0232237 A1 | 9/2013 | Zulch, III et al. | |
| 2013/0305391 A1 | 11/2013 | Haukom et al. | |
| 2014/0075506 A1 | 3/2014 | Davis et al. | |
| 2014/0163782 A1 | 6/2014 | Huynh et al. | |
| 2014/0380433 A1 | 12/2014 | Yerger et al. | |
| 2015/0169662 A1 | 6/2015 | Hills et al. | |
| 2015/0215899 A1* | 7/2015 | Kumar | H04W 12/08 455/59 |
| 2015/0330797 A1 | 11/2015 | Shukla | |
| 2015/0334173 A1 | 11/2015 | Coulmeau et al. | |
| 2015/0360796 A1 | 12/2015 | Huet et al. | |
| 2016/0019732 A1 | 1/2016 | Fournier et al. | |
| 2016/0019793 A1 | 1/2016 | Fournier et al. | |
| 2016/0035227 A1 | 2/2016 | Kumar et al. | |
| 2016/0057160 A1* | 2/2016 | Buehler | B64D 45/00 726/23 |
| 2016/0124738 A1 | 5/2016 | Haukom et al. | |
| 2016/0176538 A1 | 6/2016 | Bekanich | |
| 2016/0182687 A1 | 6/2016 | Coulmeau et al. | |
| 2016/0318622 A1 | 11/2016 | Haukom | |
| 2016/0328978 A1 | 11/2016 | Ramaker et al. | |
| 2016/0373184 A1 | 12/2016 | Oder et al. | |
| 2017/0013061 A1 | 1/2017 | Coulmeau et al. | |
| 2017/0032576 A1 | 2/2017 | Mazoyer et al. | |
| 2017/0063995 A1 | 3/2017 | Gunn et al. | |
| 2017/0124734 A1 | 5/2017 | Gowda | |
| 2017/0129623 A1 | 5/2017 | Brardo et al. | |
| 2017/0178420 A1 | 6/2017 | Byrd, Jr. | |
| 2017/0186328 A1 | 6/2017 | Beernaert | |
| 2017/0197727 A1 | 7/2017 | Kim et al. | |
| 2017/0235316 A1* | 8/2017 | Shattil | H04B 7/18504 701/3 |
| 2017/0241798 A1 | 8/2017 | Van Den Bergh et al. | |
| 2017/0242910 A1 | 8/2017 | Hochwarth et al. | |
| 2017/0251501 A1 | 8/2017 | Batsakes et al. | |
| 2017/0289189 A1 | 10/2017 | Bush et al. | |
| 2017/0295145 A1 | 10/2017 | Latorre-Costa | |
| 2017/0302684 A1 | 10/2017 | Kirk et al. | |
| 2017/0331895 A1 | 11/2017 | Manjunath | |
| 2017/0343357 A1 | 11/2017 | Mere | |
| 2017/0357618 A1 | 12/2017 | Hamblin et al. | |
| 2018/0007137 A1 | 1/2018 | Watson et al. | |
| 2018/0026706 A1 | 1/2018 | Scacchi et al. | |
| 2018/0034834 A1* | 2/2018 | Mitchell | H04B 7/18506 |

FOREIGN PATENT DOCUMENTS

| | | |
|---|---|---|
| EP | 1 961 195 B1 | 8/2016 |
| EP | 2 991 274 B1 | 2/2017 |
| WO | 2016/160501 A1 | 10/2016 |

OTHER PUBLICATIONS

Communication pursuant to Rule 69 EPC received for EP Patent Application Serial No. 19167441.5 dated Oct. 21, 2019, 2 pages.

* cited by examiner official# PROVIDING AN OPEN INTERFACE TO A FLIGHT MANAGEMENT SYSTEM

CROSS-REFERENCE TO RELATED APPLICATIONS

This application claims the benefit of U.S. Provisional Application Ser. No. 62/653,049, filed Apr. 5, 2018, and entitled "PROVIDING AN OPEN INTERFACE TO A FLIGHT MANAGEMENT SYSTEM," the entirety of which is expressly incorporated herein by reference.

TECHNICAL FIELD

The subject disclosure relates generally to navigation systems and more specifically to communicating and interfacing with navigation systems.

BACKGROUND

Navigation systems are systems that assist with navigation. An example of a navigation system is a flight management system, which can be employed within an aircraft cockpit to perform complex operations and/or complex calculations that facilitate navigation of an aircraft, especially for in-flight operations. To interact with the flight management system, the pilot or other aircraft personnel is in direct contact with the flight management system while in the cockpit of the aircraft.

SUMMARY

The following paragraphs present a simplified summary of the disclosed subject matter in order to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented below.

In accordance with various implementations, at least one partition of a partitioned operating system can be utilized to provide connectivity between a navigation system and one or more user equipment devices. Thus, the navigation system and the one or more user equipment devices can be communicatively coupled via the at least one partition. Further, a Software Development Kit (SDK) can be configured to enable bi-directional communication between the navigation system and the one or more user equipment devices. In addition, the SDK can provide security for the navigation system when communicating with the one or more user equipment devices.

An aspect relates to a system that can comprise at least one memory and at least one processor. The at least one memory can store executable components and the at least one processor can be operatively coupled to the at least one memory and can execute the executable components. The executable components can comprise an integration component that genericizes a naming of a data structure of a navigation system. The executable components can also comprise a security component that facilitates enablement of an application that supports bi-directional communication between a remote device and the navigation system. Further, the executable components can comprise a communication component that facilitates the bi-directional communication between the remote device and the navigation system. The security component can utilize the data structure naming genericized by the integration component. For example, the security component can interface with a developer component integrated within a partition of the navigation system. The remote device can be a portable electronic device external to the navigation system and/or an electronic device that can be installed on and/or communicatively coupled with the navigation system.

In an example, the partition of the navigation system can be a single partition of a partition environment that comprises a plurality of partitions. The partition can provide connectivity between the navigation system and the portable electronic device. Further to this example, the partition of the navigation system can comprise a partition memory that is independent of respective partition memories of the plurality of partitions.

According to some implementations, the security component can authenticate the remote device prior to implementing the bi-directional communication. Further, the security component can be implemented as a software development kit. In accordance with some implementations, the navigation system can be associated with an aircraft and the remote device can be located on the ground while the aircraft is in flight. In some implementations, the remote device could be located on board the aircraft.

In some implementations, the communication component can facilitate sending one or more requests to the navigation system. Further to these implementations, the one or more requests can comprise at least an edit request that can optimize a trajectory and/or can comprise a modification to data of a flight plan stored by the navigation system. In addition, the flight plan can comprise information for prediction of a four-dimensional trajectory of an aircraft.

In some cases, the one or more requests can comprise at least a query request. The query request can comprise a request for an on-demand performance calculation of an aircraft. Alternatively, or additionally, the query request can comprise a request for a trajectory determination for a flight plan segment associated with an aircraft. In alternative or additional implementations, the query request can comprise a search for data in a database stored within the navigation system.

Another embodiment relates to a method that can comprise genericizing, by a system comprising a processor, a naming of a data structure of a navigation system. The method can also comprise facilitating, by the system, development of an application that enables bi-directional communication between a remote device and the navigation system based on a utilization of the genericized data structure and comprising interfacing with a partition of the navigation system.

In an implementation, the method can comprise authenticating, by the system, the remote device prior to implementation of the bi-directional communication between the remote device and the navigation system. According to another implementation, a flight crew could actively enable the navigation system to receive information from the remote device (e.g., listen to incoming communication).

In some implementations, the method can comprise sending, by the system, one or more requests to the navigation system. The one or more requests can comprise an edit request, a query request, or combinations thereof. In an example, the edit request can comprise a modification to data of a flight plan stored by the navigation system and the flight plan can comprise information for prediction of a four-dimensional trajectory of an aircraft. According to some implementations, the edit request can be utilized to optimize a trajectory of the aircraft.

According to some implementations, the partition of the navigation system can be a single partition of a partition environment that comprises a plurality of partitions. The single partition can facilitate connectivity between the navigation system and the remote device. Further to these implementations, the partition of the navigation system can comprise a partition memory that is independent of respective partition memories of the plurality of partitions.

Other embodiments relate to a computer readable storage device comprising executable instructions that, in response to execution, cause a system comprising a processor to perform operations. The operations can comprise facilitating bi-directional communication between a remote device and a navigation system based on enablement of an application that supports the bi-directional communication between the remote device and the navigation system. The operations can also comprise placing information received from the remote device into a dedicated partition of a partition environment associated with the navigation system. Further, the operations can comprise selectively applying the information received from the remote device to the navigation system based on acceptance confirmation of the information.

In an example, selectively applying the information can comprise moving the information from the dedicated partition to an active flight plan of the navigation system. In some cases, the remote device can be a portable electronic device external to the navigation system. Further, according to some cases, the dedicated partition can be a single partition of the partition environment and the dedicated partition can be segregated from other partitions of the partition environment.

To the accomplishment of the foregoing and related ends, the disclosed subject matter comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description can include additional or alternative embodiments beyond those described in this summary.

BRIEF DESCRIPTION OF THE DRAWINGS

Various non-limiting embodiments are further described with reference to the accompanying drawings in which.

DETAILED DESCRIPTION

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details. In other instances, well-known structures and devices are shown in block diagram form in order to facilitate describing the various embodiments.

Figure 1:
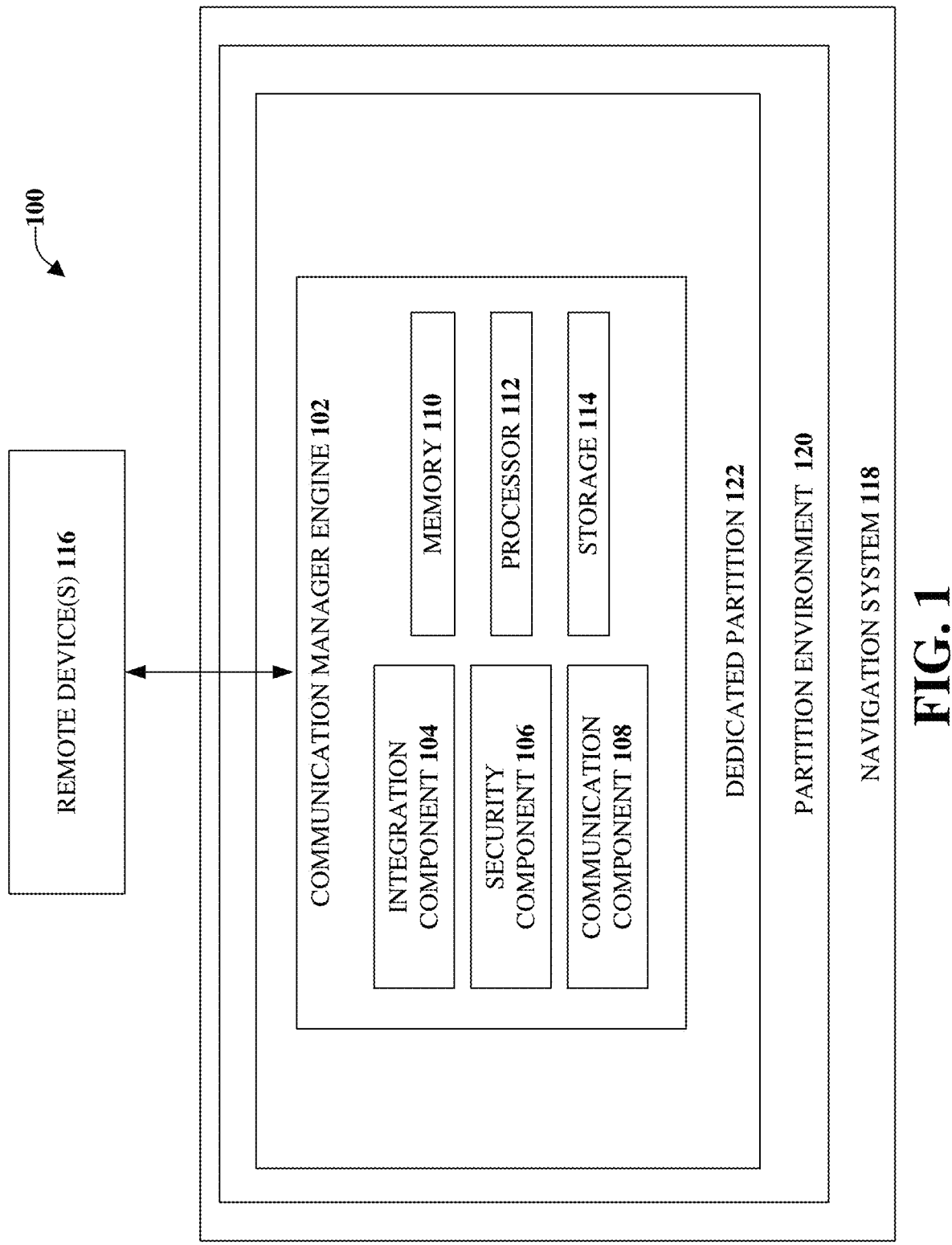
FIG. 1 illustrates an example, non-limiting, system for providing an open interface to a navigation system in accordance with one or more embodiments described herein.

FIG. 1 illustrates an example, non-limiting, system 100 for providing an open interface to a navigation system in accordance with one or more embodiments described herein. Aspects of systems (e.g., the system 100 and the like), apparatuses, or processes explained in this disclosure can constitute machine-executable component(s) embodied within machine(s), (e.g., embodied in one or more computer readable mediums (or media) associated with one or more machines). Such component(s), when executed by the one or more machines, (e.g., computer(s), computing device(s), virtual machine(s), etc.) can cause the machine(s) to perform the operations described.

In various embodiments, the system 100 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system 100 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

In the embodiment depicted in FIG. 1, the system 100 can comprise a communication manager engine 102 that can comprise an integration component 104, a security component 106, a communication component 108, a memory 110, a processor 112, and/or a storage 114. The memory 110 can store computer executable components and instructions. The processor 112 (e.g., a processing component) can facilitate execution of the instructions (e.g., computer executable components and corresponding instructions) by the communication manager engine 102, the integration component 104, the security component 106, the communication component 108, and/or other system components. As shown, in some embodiments, one or more of the communication manager engine 102, the integration component 104, the security component 106, the communication component 108, the memory 110, the processor 112, and/or the storage 114 can be electrically, communicatively, and/or operatively coupled to one another to perform one or more functions of the system 100.

In the avionics industry, flight bags have been used by pilots to store and transport paper documents (e.g., aircraft operation manuals, navigation charts, navigation checklists, information related to a flight plan, other flight-related items, and/or other items). These flight bags can be heavy and can weigh around forty pounds or more. Paper carrying flight bags can be replaced by Electronic Flight Bags (EFBs), which are electronic versions and are light-weight since EFBs have mitigated the need to carry paper documents. EFBs can utilize one or more software tools that can support flight planners, enhance pilot situational awareness, improve flight debriefing, improve reporting accuracy, and so on.

Further, Portable Electronic Devices (PEDs) or one or more remote devices (illustrated as a remote device 116) can be used on the flight deck of an aircraft (or other vehicle and/or in a different location) as paper replacement. Although one or more aspects are discussed with respect to PEDs, the disclosed aspects can also be utilized with other systems, such as ground-based systems. Further the remote device 116 can be used to perform certain functionality to supplement a navigation system 118, which is a complex system that can handle the control of large amounts of critical data for an aircraft. It is noted that although various aspects discuss a single remote device (e.g., the remote device 116), the various aspects are not limited to this implementation. Instead, two or more remote devices can be utilized with the disclosed aspects. Further, a remote device could communicate with more than one navigation system.

The various aspects discussed herein relate to an interface that can provide a means of securely enabling bi-directional communication and/or transfer of information between one or more remote applications (e.g., executable on the one or more remote devices including the remote device 116) and the navigation system 118. For example, the remote device 116 can receive information from, and send information to, the navigation system 118 via the communication manager engine 102. In a similar manner, the navigation system 118 can receive information from, and send information to, the remote device 116 via the communication manager engine 102. Further, a remote application can be, but is not limited to, an EFB application, a hosted application in a partition (or a partition environment 120 of the navigation system 118), and/or a ground-based application. As illustrated, the communication manager engine 102 can be included in its own partition (e.g., a dedicated partition 122) of the partition environment 120.

The navigation system 118 can be incorporated, at least partially, within an aircraft or another type of vehicle (e.g., an automobile, a watercraft, and so on). As mentioned, in a specific example, a navigation system could be a flight management system of an aircraft, which is a specialized computer system that can automate various in-flight tasks, which can reduce the workload of the pilot and other members of the flight crew. A function of the flight management system can be to predict a trajectory (based on the flight plan) in order to guide the aircraft to its destination. For example, the flight management system can use various sensors to determine the aircraft's position and, based on the determined position, the flight management system can guide the aircraft along the determined trajectory.

According to various aspects, there can be an "active" flight plan and a modified (or temporary) flight plan in the navigation system (e.g., the FMS). The active flight plan is the approved, or authenticated (e.g., reviewed and accepted by the flight crew) flight plan that is utilized during the flight. The modified flight plan can be a "sandbox" that highlights changes from the active flight plan. There can also be a secondary flight plan, which is another sandbox where the flight crew can prepare for the next leg (or flight) of the trip. The secondary flight plan can be swapped with the active flight plan, if desired.

According to some implementations, the modifications from the EFB, as discussed herein, can be sent to the active flight plan and/or the secondary flight plan. For example, there can be one or more configurable flight plans that can be rendered on the remote device 116 prior to, or during, the flight. The flight plan can be rendered on the remote device 116 (or more than one device) to allow for viewing and/or altering of the flight plan. Upon or after authentication with the navigation system, the altered flight plan can be accepted and can replace the active flight plan and/or the secondary flight plan) in the navigation system.

The authentication can begin with the pairing process (or automated key/certificate exchange). The key can be used to attach, encrypt, or scramble the communication and only if the navigation system knows the same key, the navigation system can make use of a message it receives from the EFB. Thus, the navigation system can use that to authenticate the message. Upon or after the message has been authenticated as coming from one of the EFBs, the data can be presented to the flight crew in a modified (or temporary) flight plan. The flight crew can then activate/accept those changes to become the active flight plan.

In order to render the flight plan (or other information) on the remote device 116, without the needed for an intermediary device between the remote device 116 and the navigation system 118, the integration component 104 can genericize the naming of one or more data structures and/or methodologies of the navigation system 118. The one or more data structures and/or methodologies can be navigation system-specific data structures and/or methodologies. To genericize the naming of one or more data structures, the integration component 104 can abstract and/or encapsulate the data contained in the data structure. Such abstraction and/or encapsulation of the naming of one or more data structures and/or methodologies can be utilized such that an EFB application developer entity does not need intrinsic domain knowledge.

Further, the security component 106 can facilitate enablement of an application that supports the bi-directional communication between the remote device 116 and the navigation system 118. According to an implementation, the security component 106 can utilize the data structure naming genericized by the integration component 104 to facilitate enablement of the application. The security component 106 can be implemented as the software development kit.

According to various embodiments, the remote device 116 (e.g., personal electronic device) can be utilized for review, modification, and/or other functionalities associated with data of the navigation system 118, which can occur at a different location than the location of the navigation system 118. For example, the review and/or modification can occur within the airport terminal (or even outside the premises of the airport). Thereafter, the remote device 116 can be moved to a designated area (e.g., a cockpit of an aircraft) and can connect to the avionics (e.g., the navigation system 118). The remote device 116 and the navigation system 118 can communicate with one another without the need for one or more intermediary devices, such as an Aircraft Interface Device (AID) to communicatively couple the remote device 116 to the navigation system 118.

For example, according to various implementations, the navigation system 118 can be running on a partitioned operating system (e.g., the partition environment 120), which can be a partitioned operating system per Aeronautical Radio, Incorporated (ARINC) 653. One or more dedicated partitions in the navigation system 118 can be created that can provide connectivity to the outside world (e.g., one or more remote devices). These partitions can be used for highly sensitive or safety critical systems. If one partition shuts down, corrupt data is received, or another failure occurs, that single partition does not impact any of the other partitions. Thus, if there is something critical (or non-critical) running in a separate partition and an entity tries to maliciously attack the system through the connected navigation system partition, it will not have an impact. Thus, the system 100 can provide a domain guard between the aircraft control domain on the avionics side and the aircraft information service domain outside without the need for an AID. The aircraft control domain comprises systems and networks that have a primary function of supporting the safe operation of the aircraft. The aircraft control domain can provide services and connectivity between independent aircraft domains, such as the aircraft information service domain. The aircraft information service domain can provide a security perimeter and/or can incorporate network routing and security functions and services between the aircraft information service domain and less critical domains, as well as other connected wireless networks.

Also provided is a Software Developer Kit (SDK), which can be facilitated through the communication manager engine 102. It is noted that the communication manager engine 102 can be implemented, at least partially, on the remote device 116 and the navigation system 118. The communication between the remote device 116 and the navigation system 118 (e.g., the connected navigation system partition) can be facilitated through the SDK, which can be provided to application developer entity as software to be built into the application and hosted on the remote device 116. The SDK can comprise the communication protocols and security procedures already built in. If an entity wants to develop an application on remote device 116 that does some flight plan editing (e.g., insert waypoints, modifying a flight plan, and so on) the SDK can be used and can facilitate implementation of security for the information. It is noted that the SDK can comprise libraries that can be built into EFB applications. There can also be a counterpart in the navigation system 118. Thus, there can be encryption, built in security, authentication at the remote device 116, and then the navigation system 118 (e.g., the connected navigation system partition) can decrypt the information.

There are a multitude of different use cases for the disclosed aspects. On the EFB, a multitude of outside applications can be interested in determining how to predict a flight that comprises a list of waypoints. The navigation system, knowing the trajectory of the aircraft, will fly the aircraft and can output the information as a visual overlay (e.g., overlaid on an electronic mapping application). This can be performed in a configurable manner and can be utilized to get information out of the navigation system.

However, malware of the remote device 116 could attack the navigation system 118. However, a connected navigation system partition inside the navigation system, as discussed herein, can be a dedicated gatekeeper for everything coming in and going out of the navigation system. For example, upon or after detection of an event (e.g., identification of a virus, malware, or other type of detection), the partition can be shut down in order to mitigate an impact on the rest of the navigation system. Accordingly, the partitions can operate independently (e.g., per ARINC 653).

Another concern that can be mitigated with the disclosed aspects is that inside the navigation system there can be flight plans that define departure airport, departure procedure, waypoints, airways, arrival procedures, arrival airport, and so on (e.g., navigation aids). There can be multiple copies (e.g., on one or more remote devices). However, the multiple copies can be controlled to one copy, which is the active flight plan. The active flight plan controls the aircraft (e.g., if the trajectory predicted by the navigation system based on the flight plan indicates to turn right, the aircraft will turn right). When an edit request (e.g., insert a waypoint, remove a waypoint, and so on) is sent, from the remote device 116 to the navigation system 118, the security component 106 can make sure the request is authenticated before being applied to the active flight plan. For example, the security component 106 can ensure the request is reviewed by authorized personnel (e.g., the flight crew) in the certified embedded system (e.g., in the navigation system 118). Thus, the security component 106 does not rely on the remote device 116. Instead, the final review of the flight plan can occur inside the certified flight system. Therefore, any changes can be loaded into a modified flight plan that is segregated from the other flight plan (e.g., the active flight plan), such as in a sandbox, or other review environment, for the flight crew to review and confirm, prior to the change being applied to the active flight plan.

Further, upon or after receipt of the edits in the connected navigation system partition; the connected navigation system partition could drive different layers of displays. For example, there can be different displays in the cockpit (e.g., primary flight display, artificial horizon, navigation display, which is a lateral map, and so on), and using technology similar to ARINC 661 technology (e.g., Graphical User Interface (GUI) for avionics) multiple layers can be utilized to show the route the navigation system has and another layer could be driven from connected navigation system partition, which can be overlaid on the navigation system route so the flight crew can review the changes before the changes are transitioned from the connected navigation system partition inside the navigation system. Thus, the modified flight plan can be displayed in conjunction with the active flight plan, which can be rendered on a navigation display of the navigation system according to some implementations. Further, the layers can be rendered on the display such that the trajectory predicted by the navigation system based on the flight plan can be distinguished from the (unpredicted) flight plan received from the remote device. According to some implementations, the different layers could be driven by an Electronic Flight Instrument System (EFIS), which is a flight deck instrument display system that can display flight data electronically instead of electromechanically.

The connected navigation system partition can drive a separate layer since there are multiple layers on the GUI. Therefore, the active flight plan can be on a first layer driven by navigation system and the modified flight plan can be on a second layer driven by the connected navigation system partition. Thus, what is rendered on the remote device 116 can overlay what is rendered on the navigation display through the connected navigation system partition before it ever enters the navigation system.

A Connected Flight Management System (CFMS) concept provides not only output of Flight Management System (FMS) internal parameters for use in external applications (e.g., on the remote device 116) but can also allow external applications to send requests back to a navigation, such as the FMS (e.g., facilitates communication between the one or more external applications and the FMS). Edit requests for the flight plan can be stored inside the FMS. An edit request could be for modifying the flight plan for a simple reroute (e.g., the divert around convective weather) or a more complex optimization. The flight plan contains the information the FMS utilizes to predict a four-dimensional (4D) trajectory. Query requests could be for content of a Navigation Database (NDB). Alternatively, query requests could be for on-demand performance calculations (e.g. takeoff speeds) or "what-if" trajectory predictions for a flight plan segment or one or more flight plan segments, wherein a flight plan comprises multiple segments.

An open interface can allow another system (e.g., an Advanced Interval Management (AIM) system) to benefit from what the navigation system has already implemented. For example, the other system can utilize one or more predictions already determined by the navigation system in order to avoid duplication of resources and/or shorten the amount of time for such predictions.

Further, the CFMS can allow an external application access to the FMS internal data parameters based on a field-loadable database (e.g., a configuration table). The various aspects provided herein provide respective SDKs on one or more external devices (e.g., one or more remote applications). The SDKs can be used to easily develop an application that enables bi-directional communication with the FMS. The SDK can abstract and/or encapsulate FMS-specific data structures and methodologies so that an application developer does not need intrinsic domain knowledge. Further, the disclosed aspects can also allow the application developer to develop the application once and the SDK can handle differences when the application is deployed across different aircrafts and/or different FMSs.

The SDK can also implement security to ensure only authenticated devices and software communicates with the FMS. For example, there could be malware running on the remote device that is attempting to (maliciously) communicate with the navigation system. The malware could attack and/or hijack the application (e.g., the SDK) and piggyback through the application in an attempt to communicate with the navigation system. Thus, the SDK can add information to the communication, and the navigation system can use the information to ensure the communication was received from an authenticated application executing on the device. Accordingly, such attempts by malware to communicate with the navigation system can be detected and denied.

According to an implementation, the system 100 can provide an SDK with a CFMS partition that provides a "domain guard" without additional hardware. According to various implementations, the disclosed aspects can be implemented and/or hosted as (at least a portion of) a multi-processor environment (e.g., an Integrated Modular Avionics (IMA)). An IMA is a real-time computer network airborne system that comprises computing modules capable of supporting a variety of applications that can comprise differing criticality levels.

The FMS itself can be implemented in a partition environment (e.g., per ARINC 653). These partitions are memory and schedule/time independent and one partition can only affect another in a very defined way. Accordingly, as discussed herein, the security of the FMS can be built around a separate partition that interfaces with external applications. Thus, the separate partition can isolate the navigation system (e.g., the FMS) from outside processing. Accordingly, any malicious attempts for interaction with the FMS can be isolated without compromising core functionality. Further details related to the partition environment 120 will be discussed below with respect to FIG. 3.

According to the aspects provided herein, the SDK can be integrated with a separate partition in the FMS for direct interaction between an external application and the FMS. This can allow the various aspects to bypass a domain guard (e.g. Aircraft Interface Device (AID) per ARINC 759) for a communication directly from the external application(s) with the FMS. This deterministic network would still protect interaction to only the defined virtual links and, therefore, a direct line of communication between the remote application and the FMS could still exist.

Further, the various aspects can provide built-in security for the connectivity between a remote application and the FMS. Instead of requiring an additional "domain guard" (e.g. AID), the SDK and CFMS partition can provide this functionality instead as discussed herein. The removal of an additional piece of hardware can reduce complexity and eliminate a point of failure. The offering of an SDK with all the connectivity and security built in can be an advantage for development of the application.

One or more remote devices can be associated with different users. For example, a first remote device can be associated with a pilot of the aircraft, a second remote device can be associated with a co-pilot of the aircraft, and so on. In some cases, two or more remote devices can be associated with a single user. For example, a single user can be associated with a cell phone and a laptop computer (or another type of device).

Further, devices of the one or more remote devices can be different types of devices. In an example, the remote devices can be Portable Electronic Devices (PEDs) that can be associated with activities of the flight deck (e.g., utilized within an aircraft) as paper replacement.

The one or more remote devices can be separate from the navigation system 118. In an example, a device of the one or more remote devices can be located external to the navigation system 118. In an aircraft implementation, a device of the one or more remote devices can be located on the ground while the aircraft is in flight. In another vehicle implementation, a device of the one or more remote devices can be located at a first location, while the navigation system 118 is associated with a vehicle located at a second location, different from the first location. In some implementations, the one or more remote devices and the navigation system 118 (and associated aircraft, vehicle, and so on) can be in movement (e.g., a distance between the devices can be increasing, decreasing, staying the same, and so on). In an additional or alternative example, a device of the one or more remote devices could be interfacing with a third-party component operating in another partition of the partition environment 120, other than the dedicated partition 122.

For example, the communication manager engine 102 (e.g., via the communication component 108) can facilitate transfer of information between the remote device 116 and the navigation system 118. The term "remote" is utilized because the remote devices can be devices that are not integrated with the navigation system (e.g., can be communicatively coupled with the navigation system but not physically attached to the navigation system). Further, the remote device 116 could be located in a similar location as the navigation system (e.g., in the cockpit of an aircraft) or at a different location (e.g., the navigation system is integrated in the airplane and the remote device could be located in the airport terminal, at a user's home, or in another location). According to some implementations, the remote device 116 could be located on the ground and the navigation system 118 could be integrated in an aircraft that is in flight.

At least one memory (e.g., the memory 110) can be operatively coupled to at least one processor (e.g., the processor 112). The memory 110 can store computer executable components and/or computer executable instructions. The processor 112 can facilitate execution of the computer executable components and/or the computer executable instructions stored in the memory 110. The term "coupled" or variants thereof can include various communications including, but not limited to, direct communications, indirect communications, wired communications, and/or wireless communications.

The memory 110 can store protocols associated with providing a communication interface to the navigation system as discussed herein. Further, the memory 110 can facilitate action to control communication between the system 100, other systems, one or more navigation systems, one or more mobile devices, and/or other devices, such that the system 100 can employ stored protocols and/or algorithms to achieve improved communications as described herein.

It is noted that although the one or more computer executable components and/or computer executable instructions are illustrated and described herein as components and/or instructions separate from the memory 110 (e.g., operatively connected to the memory 110), the various aspects are not limited to this implementation. Instead, in accordance with various implementations, the one or more computer executable components and/or the one or more computer executable instructions can be stored in (or integrated within) the memory 110. Further, while various components and/or instructions have been illustrated as separate components and/or as separate instructions, in some implementations, multiple components and/or multiple instructions can be implemented as a single component or as a single instruction. Further, a single component and/or a single instruction can be implemented as multiple components and/or as multiple instructions without departing from the example embodiments.

The processor 112 can facilitate respective analysis of information related to communications associated with bi-directional communication. The processor 112 can be a processor dedicated to analyzing and/or generating actions based on data received, a processor that controls one or more components of the system 100, and/or a processor that both analyzes and generates bi-directional communication based on data received and controls one or more components of the system 100.

In various embodiments, components (or parts of components) of the system 100 can be a cloud computing based system associated with technologies such as, but not limited to, cloud circuit technologies, cloud computing technologies, artificial intelligence technologies, avionics technologies, logistic technologies, transportation technologies, and/or other digital technologies. The system 100 can employ hardware and/or software to solve problems that are highly technical in nature, that are not abstract and that cannot be performed as a set of mental acts by a human. Further, in certain embodiments, some of the processes performed can be performed by one or more specialized computers (e.g., one or more specialized processing units, a specialized computer with a cloud computing component, etc.) to carry out defined tasks related to providing an open interface to a navigation system and/or machine learning.

The system 100 and/or components of the system 100 can be employed to solve new problems that arise through advancements in technologies mentioned above, computer architecture, and/or the like. One or more embodiments of the system 100 can provide technical improvements to navigation systems, transportation systems, cloud computing systems, cloud circuit systems, cloud processor systems, artificial intelligence systems, and/or other systems. One or more embodiments of the system 100 can also provide technical improvements to a navigation system processor by improving processing performance of the navigation system processor. Further, one or more embodiments of the system 100 can provide technical improvements to a navigation system processor by improving processing efficiency of the navigation system processor, improving processing characteristics of the navigation system processor, and/or improving power efficiency of the navigation system processor. According to some implementations, the offload calculations can take advantage of more powerful processors outside the FMS (or navigation system). Further, there can be more memory and/or less expensive software development on a non-certified system, which can provide quicker turn-around cycles.

It is to be appreciated that the system 100 (e.g., the communication manager engine 102, the integration component 104, the security component 106, the communication component 108, and/or other system components) can facilitate providing an open interface to a navigation system that cannot be performed by a human (e.g., is greater than the capability of a single human mind). For example, an amount of data processed, a speed of data processed and/or data types of data processed by the system 100 (e.g., the communication manager engine 102, the integration component 104, the security component 106, the communication component 108, and/or other system components) over a certain period of time can be greater, faster, and different than an amount, speed, and data type that can be processed by a single human mind over the same period of time. The system 100 (e.g., the communication manager engine 102, the integration component 104, the security component 106, the communication component 108, and/or other system components) can also be fully operational towards performing one or more other functions (e.g., fully powered on, fully executed, etc.) while also performing the above-referenced providing an open interface to a navigation system. Moreover, facilitating providing an open interface to a navigation system can be executed and coordinated by the system 100 (e.g., the communication manager engine 102, the integration component 104, the security component 106, the communication component 108, and/or other system components) can include information that is impossible to obtain manually by a user. For example, a type of information can be included as input data and/or output data, a variety of information can associated with the input data and/or output data, a distance between a transmitter and receiver of data, and/or optimization of the input data to generate and output the one or more respective data structures and related information for bi-directional communication of data can be more complex than information that can be obtained manually and processed by a user.

Figure 2:
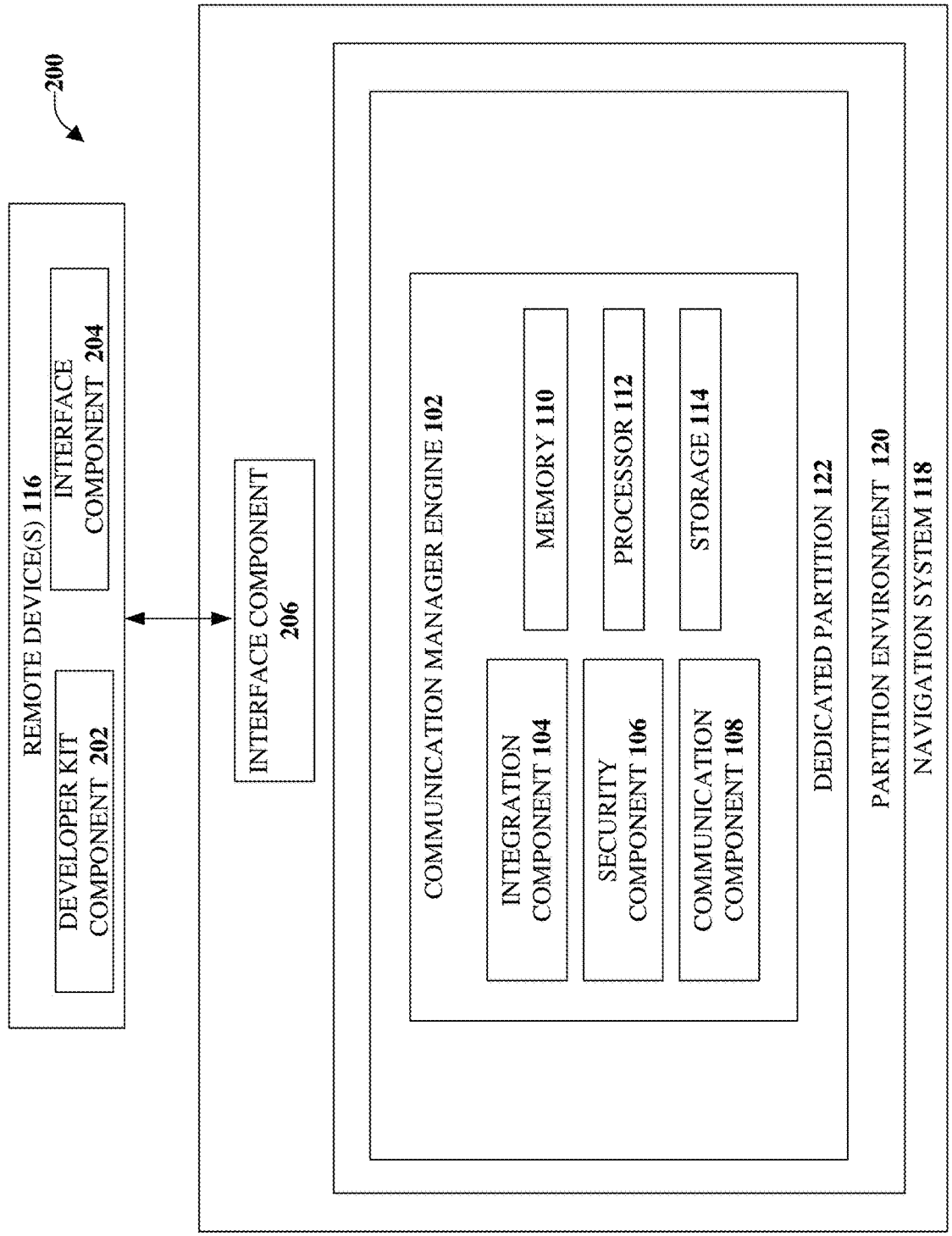
FIG. 2 illustrates an example, non-limiting, system that utilizes a development kit to facilitate communications in accordance with one or more embodiments described herein.

FIG. 2 illustrates an example, non-limiting, system 200 that utilizes a development kit to facilitate communications in accordance with one or more embodiments described herein. Repetitive description of like elements employed in other embodiments described herein is omitted for sake of brevity.

The system 200 can comprise one or more of the components and/or functionality of the system 100 and vice versa. Communication between the remote device 116 (e.g., the remote application) and the navigation system 118 can be facilitated through a developer kit component 202. According to some implementations, the developer kit component 202 can comprise integrated communication and security functionalities. Applications, such as, but not limited to flight plan editing and/or optimizing a flight plan, can be developed on the remote device 116 via the developer kit component 202 and an interface component 204.

For example, the developer kit component 202 can be used by an application on the remote device 116 to encrypt information prior to the information being sent to the navigation system 118. The encrypted information can be received at another interface component 206 (or another component) of the navigation system 118. The encrypted information can be decrypted by the security component 106 or another system component.

According to some implementations, the remote device 116 and/or the navigation system 118 can comprise respective interface components or display units (e.g., the interface component 204, the interface component 206) that can facilitate the input and/or output of information to the one or more display units. The interface component 204, in an example, can be a "user friendly interface" such as an Electronic Flight Bag (EFB), which came into existence as a paper replacement and can be an electronic information management device that helps facilitate flight management tasks as well as other tasks. For example, an EFB can include one or more electric devices that can store information in a digital format.

By way of example and not limitation, a graphical user interface can be output on one or more display units and/or mobile devices as discussed herein, which can be facilitated by the interface component. A mobile device (or remote device) can also be called, and can contain some or all of the functionality of, a system, subscriber unit, subscriber station, mobile station, mobile, mobile device, device, wireless terminal, remote station, remote terminal, access terminal, user terminal, terminal, wireless communication device, wireless communication apparatus, user agent, user device, or User Equipment (UE). A mobile device can be a cellular telephone, a cordless telephone, a Session Initiation Protocol (SIP) phone, a smart phone, a feature phone, a Wireless Local Loop (WLL) station, a Personal Digital Assistant (PDA), a laptop, a handheld communication device, a handheld computing device, a netbook, a tablet, a satellite radio, a data card, a wireless modem card, and/or another processing device for communicating over a wireless system. Further, although discussed with respect to wireless devices, the disclosed aspects can also be implemented with wired devices, or with both wired and wireless devices.

The display units (as well as other interface components discussed herein) can provide, a command line interface, a speech interface, natural language text interface, and the like. For example, a GUI can be rendered that provides a user with a region or means to load, import, select, read, and so forth, various requests and can include a region to present the results of the various requests. These regions can include known text and/or graphic regions that include dialog boxes, static controls, drop-down-menus, list boxes, pop-up menus, as edit controls, combo boxes, radio buttons, check boxes, push buttons, graphic boxes, and so on. In addition, utilities to facilitate the information conveyance, such as vertical and/or horizontal scroll bars for navigation and toolbar buttons to determine whether a region will be viewable, can be employed. Thus, it could be inferred that the user did want the action performed.

The user can also interact with the regions to select and provide information through various devices such as a mouse, a touchpad, a roller ball, a keypad, a keyboard, a pen, gestures captured with a camera, a touchscreen, and/or voice activation, for example. According to an aspect, a mechanism, such as a push button or the enter key on the keyboard, can be employed subsequent to entering the information in order to initiate information conveyance. However, it is to be appreciated that the disclosed aspects are not so limited. For example, merely highlighting a check box can initiate information conveyance. In another example, a command line interface can be employed. For example, the command line interface can prompt the user for information by providing a text message, producing an audio tone, or the like. The user can then provide suitable information, such as alphanumeric input corresponding to an option provided in the interface prompt or an answer to a question posed in the prompt. It is to be appreciated that the command line interface can be employed in connection with a GUI and/or Application Programming Interface (API). In addition, the command line interface can be employed in connection with hardware (e.g., video cards) and/or displays (e.g., black and white, and Video Graphics Array (VGA)) with limited graphic support, and/or low bandwidth communication channels.

Figure 3:
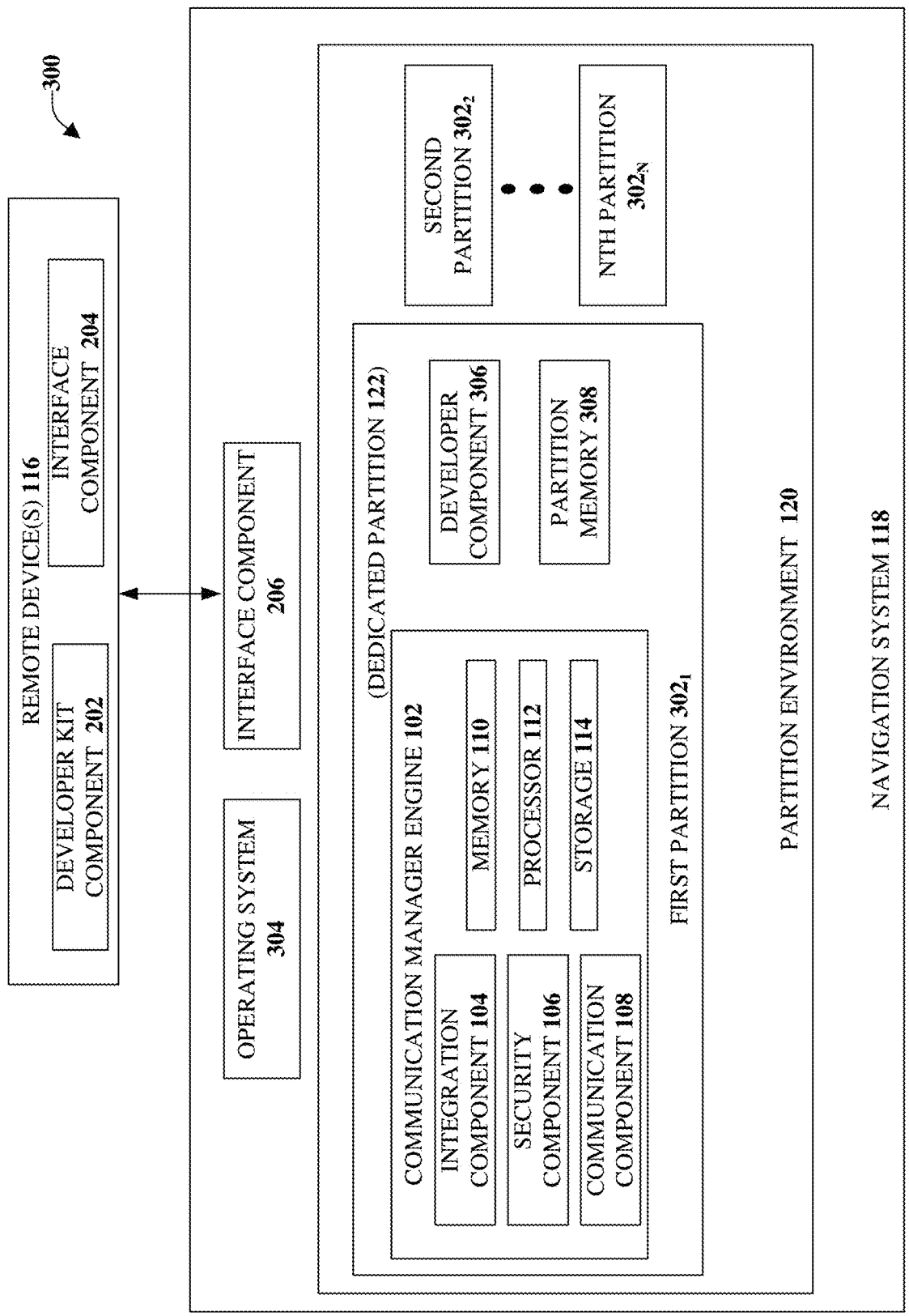
FIG. 3 illustrates an example, non-limiting, system that utilizes a partition of a navigation system to facilitate communications in accordance with one or more embodiments described herein.

FIG. 3 illustrates an example, non-limiting, system 300 that utilizes a partition of a navigation system to facilitate communications in accordance with one or more embodiments described herein. Repetitive description of like elements employed in other embodiments described herein is omitted for sake of brevity.

The system 300 can comprise one or more of the components and/or functionality of the system 100, the system 200, and vice versa. As illustrated, the navigation system 118 can comprise a partition environment 120 that can comprise a multitude of partitions, a few of which are illustrated as a first partition $302_1$, a second partition $302_2$, through a Nth partition $302_N$, where N is an integer. The partitions (e.g., the first partition $302_1$, the second partition $302_2$, and the Nth partition $302_N$) can be communicatively coupled to one another and to other system components via an operating system 304. The operating system 304 can comprise one or more memories and one or more processors.

The partitions (e.g., the first partition $302_1$, the second partition $302_2$, and the Nth partition $302_N$) can be similar to partitions specified in the Avionics Application Standard Software Interface (ARINC 653), according to an implementation. ARINC 653 is included in ARINC 600-Series standards for digital aircraft and flight simulators. ARINC 653 provides a software specification for space and time partitioning in safety-critical avionics real-time operating systems. Further, ARINC 653 provides for the hosting of multiple applications of different software levels on the same hardware in the context of an integrated modular avionics architecture.

At least one of the partitions (e.g., at least one of the first partition $302_1$, the second partition $302_2$, and the Nth partition $302_N$) can be dedicated or only used for the connectivity between the navigation system 118 and the remote device 116 as discussed herein. At least some of the partitions in the partition environment can be used for highly sensitive and/or safety critical systems. Therefore, if one partition shuts down, becomes corrupt, or another type of failure occurs, since the partitions are separated from one another, there is no impact on the other partitions. For example, if a malicious attack is attempted (or is successful) on the first partition $302_1$, the other partitions (e.g., the second partition $302_2$, the Nth partition $302_N$) are not affected. In an example, one of the other partitions (e.g., the second partition $302_2$) can be utilized for implementation of at least a portion of the navigation system 118 (e.g., active flight plans). Accordingly, even if a malicious attack occurred on the first partition $302_1$, the active flight plan (in the second partition $302_2$) is not impacted. The active flight plan is the flight plan that the flight management system is actively using to fly the aircraft.

The security component 106 can interface with a developer component 306 integrated within a partition (e.g., the first partition $302_1$) of the navigation system 118. The first partition $302_1$ can also comprise a partition memory 308, which can be independent of respective partition memories of other partitions (e.g., the second partition $302_2$ and the Nth partition $302_N$) within the partition environment 120.

The partition memory 308 can retain information related to communications between the navigation system 118 and the remote device 116. For example, the information can be stored in data stores or special data structures. The output of the information can be configurable with flexible access to the internal data. For example, a user, through an associated remote device, such as the remote device 116 (e.g., via the interface component 204) and/or the navigation system 118 (e.g., via the interface component 206) can choose the parameters that should be output. In a specific, non-limiting example, there can be an in-service problem (e.g., an error message that is difficult to recreate) that occurs when an aircraft is flying out of a particular airport (but not when flying out of other airports). A loadable database can be created to output data that can be utilized to diagnose (e.g., debug) the problem, which can be sent to an aircraft (e.g., uploaded to the navigation system 118) and during the flight, the information can be automatically recorded (e.g., by an EFB or another device).

Figure 4:
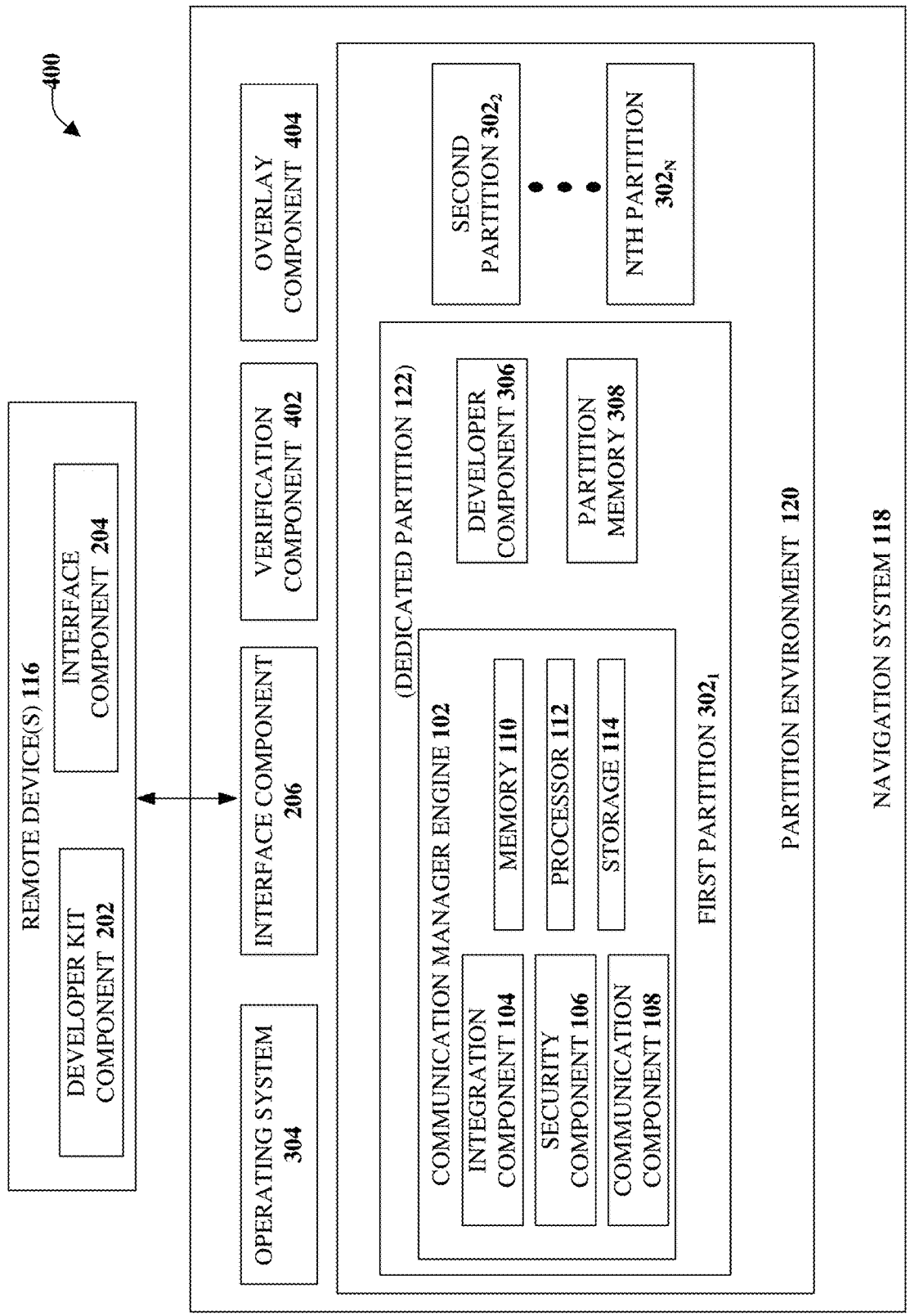
FIG. 4 illustrates an example, non-limiting, system for rendering modifications to a flight plan on one or more displays in accordance with one or more embodiments described herein.

FIG. 4 illustrates an example, non-limiting, system 400 for rendering modifications to a flight plan on one or more displays in accordance with one or more embodiments described herein. Repetitive description of like elements employed in other embodiments described herein is omitted for sake of brevity.

The system 400 can comprise one or more of the components and/or functionality of the system 100, the system 200, the system 300, and vice versa. The disclosed aspects can be utilized to visualize instances based on applications, that are outside the system, request prediction of a (short) flight plan. The navigation system 118 can fly the aircraft and determine the trajectory, which can be output to the remote application (e.g., the remote device 116). For example, the navigation system 118 can operate the aircraft and can provide the information to the remote device 116 (e.g., the remote application). The information can be displayed on the interface component 204 of the remote device 116, even though the remote device may be located in another geographic area. For example, prior to the flight, the pilot can review the flight information at a location other than the flight deck and can make one or more modifications through interaction with the interface component 204. The modifications can be retained on the remote device until the remote device is physically connect to the navigation system 118, or connected to the navigation system 118 in another secure manner (e.g., is in close proximity to the navigation system, interfaces with another device that is in secure communication with the navigation system 118, is paired with the navigation system 118, and so on).

To incorporate the changes made on the remote device 116 to the navigation system 118, the remote device 116 can communicate with the dedicated partition 122 (e.g., the connected navigation system partition, the first partition $302_1$). By interacting with only the dedicated partition 122, if there is malware on the remote device that attacks the navigation system 118, the connected navigation system partition can be the dedicated gatekeeper of any information received and/or output via the communication manager engine 102. Therefore, if a virus or malware is detected, the dedicated partition 122 can shut down and not impact the remainder of the navigation system 118. Thus, the partitions can operate independently.

In addition, inside the navigation system 118 there can be flight plans that define departure airports, departure procedures, the waypoints, the airways, the arrival procedures, and the arrival airports. These are all points, sometimes navigational aids, such as a list of points along which the aircraft will traverse (e.g., the flight plan). There can be multiple copies of the flight data. One of the copies (e.g., a master copy) is the active flight plan, which can be currently active or the flight plan that the aircraft is using to navigate the flight. For example, the flight plan is used by a trajectory generation function within the navigation system 118 to generate a trajectory to which the aircraft is controlled.

If an edit request (e.g., insert a waypoint, remove a waypoint) is being sent from the remote device 116 to the navigation system 118, the change should be reviewed somewhere in the certified system. The certified system can include at least one member of the flight crew and the navigation system 118. Thus, nothing perceived on the remote device should be relied upon due to the integrity, the hardware, the availability of the remote device, and so on. Thus, the final review by the flight crew should occur inside the certified system (e.g., at a verification component 402). Interaction with the verification component 402 can be facilitated by the interface component 206.

Thus, similar to a data link between the aircraft to an air traffic control center or dispatcher, any changes to the flight plan (e.g., a modified or secondary flight plan) can be loaded, which can be completely segregated from the actual flight plan. In an example, the changes to the flight plan can be segregated in the dedicated partition 122. According to another example, the changes to the flight plan can be included as part of the core partition (which can contain the flight plan management function) but a dedicated separate memory structure. This can be similar to a sandbox for the flight crew to review what the changes will look like. The flight crew can review the modified flight plan, make sure the changes are intended changes, and push a button or make another selection (e.g., through the interface component 206) to make it the active flight plan.

Once the flight plan is changed, the dedicated partition 122 could drive different layers of display. There are different displays in the cockpit, such as artificial horizon, the navigation display, which is a lateral map (which is a GUI for avionics) using ARINC 661 and/or ARINC 739 technology. It is noted that the legacy navigational display can utilize the Electronic Flight Information System (EFIS) per ARINC 702A. Further, there can be multiple layers to show the role the flight management can have, and the other layers can be driven from the connected flight management partition (e.g., the dedicated partition).

In an example, an overlay component 404 can be utilized to view a current or active flight plan and one or more modifications to the active flight plan at substantially the same time. For example, an electronic map can be rendered via the interface component 206 or via one or more displays. The electronic map can include the route of the active flight plan and the modified plan can be overlaid on the active flight plan in such a manner that both flight plans can be viewed. For example, the modified flight plan can be transparent such that the active flight plan can be viewed through the modified flight plan. By viewing both flight plans at substantially the same time, modifications can be made in a configurable manner prior to accepting the changes.

In an example, the user can build a flight plan and indicate to insert waypoints at a location, transfer this entire flight plan to the navigation system, and so on. The flight crew might receive the flight plan in the pilot's lounge (while waiting for the inbound aircraft) from the dispatcher, review it and make changes, go into the cockpit, pair the devices (e.g., the remote device and the navigation system 118) and transfer the flight plan into the navigation system 118. Thus, the navigation system 118 can provide a pairing algorithm and only the flight crew can see the number (or other code) to authenticate. The number (or other code) can be used as a key and private key exchanges can be made for security purposes. Other methodologies can also be utilized (e.g., private/public key exchange and a secure key store, and so on), which would not require a manual pairing processing.

Figure 5:
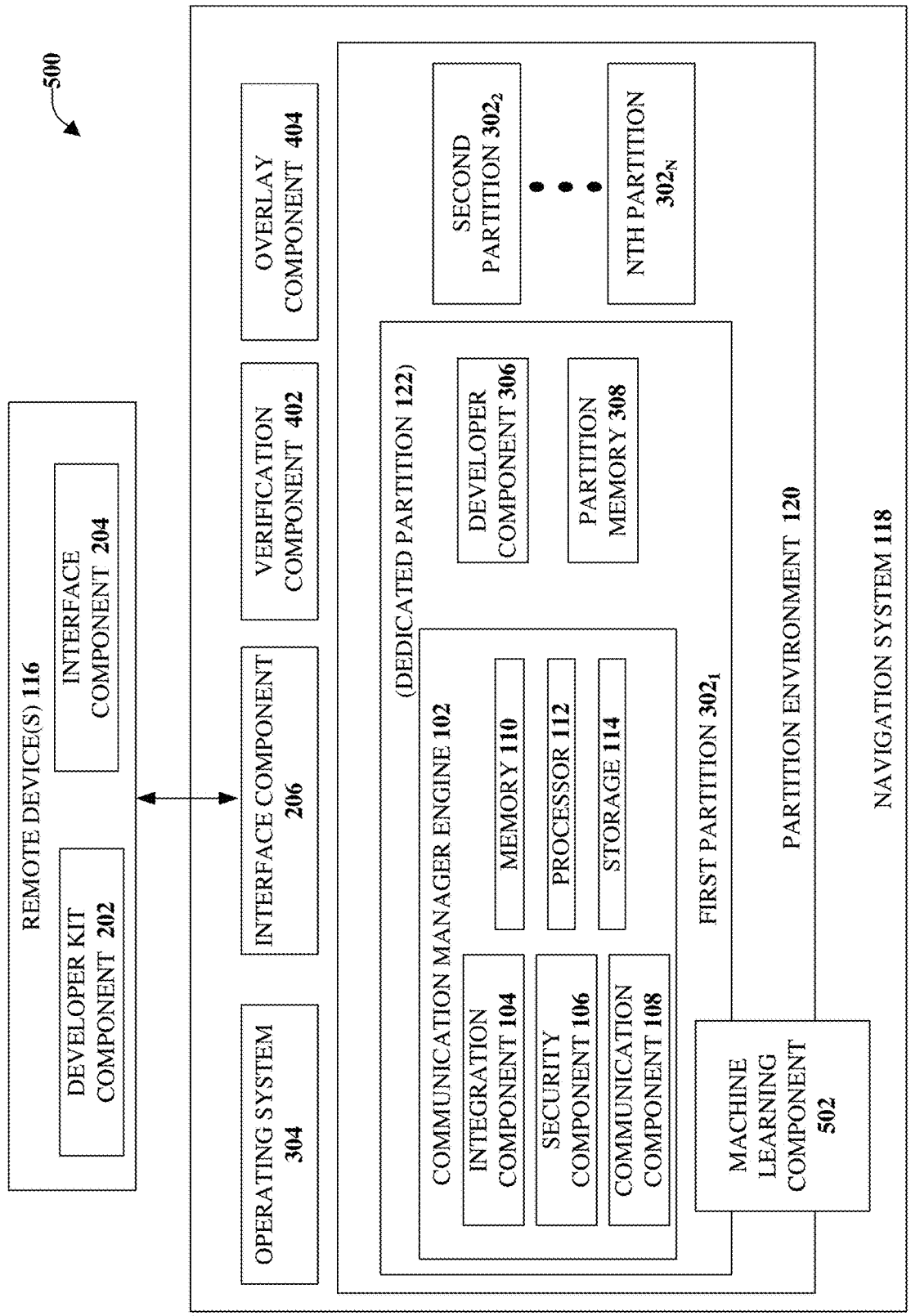
FIG. 5 illustrates another example, non-limiting, system for facilitating modifications to at least a portion of a navigation system by a remote device in accordance with one or more embodiments described herein.

FIG. 5 illustrates another example, non-limiting, system 500 for facilitating modifications to at least a portion of a navigation system by a remote device in accordance with one or more embodiments described herein. Repetitive description of like elements employed in other embodiments described herein is omitted for sake of brevity.

The system 500 can comprise one or more of the components and/or functionality of the system 100, the system 200, the system 300, and/or the system 400, and vice versa. The system 500 can include a machine learning and reasoning component 502, which can employ automated learning and reasoning procedures (e.g., the use of explicitly and/or implicitly trained statistical classifiers) in connection with performing inference and/or probabilistic determinations and/or statistical-based determinations in accordance with one or more aspects described herein.

According to some implementations, the machine learning and reasoning component 502 can facilitate single-operation (e.g., single pilot) and/or autonomous operation of a vehicle (e.g., aircraft, automobile, watercraft, and so on).

In some implementations, the machine learning and reasoning component 502 can employ principles of probabilistic and decision theoretic inference. Additionally, or alternatively, the machine learning and reasoning component 502 can rely on predictive models constructed using machine learning and/or automated learning procedures. Logic-centric inference can also be employed separately or in conjunction with probabilistic methods.

The machine learning and reasoning component 502 can infer whether one or more remote devices are authenticated devices, whether one or more changes initiated at remote devices should be implemented in a navigation system, and/or whether other types of communications between one or more remote devices and a navigation system should be implemented.

As it relates to machine learning, as used herein, the term "inference" refers generally to the process of reasoning about or inferring states of the system, a component, a module, the environment, and/or assets from a set of observations as captured through events, reports, data and/or through other forms of communication. Inference can be employed to identify a specific context or action, or can generate a probability distribution over states, for example. The inference can be probabilistic. For example, computation of a probability distribution over states of interest based on a consideration of data and/or events. The inference can also refer to techniques employed for composing higher-level events from a set of events and/or data. Such inference can result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

The various aspects (e.g., in connection with an open interface from one or more remote devices to a navigation system (or more than one navigation system)) can employ various artificial intelligence-based schemes for carrying out various aspects thereof. For example, a process for evaluating credentials of one or more remote devices can be utilized to determine if information from a remote device should be transferred to the navigation system, whether one or more changes to a flight plan should be implemented at the navigation system, and so on.

A classifier is a function that maps an input attribute vector, $x=(x1, x2, x3, x4, xn)$, to a confidence that the input belongs to a class. In other words, $f(x)=confidence(class)$. Such classification can employ a probabilistic and/or statistical-based analysis (e.g., factoring into the analysis utilities and costs) to provide a prognosis or infer an action that should be implemented based on received operating conditions and current conditions, whether to selectively modify a recommended path, and so on. In the case of bi-directional communications, for example, attributes can be identification of users of one or more remote devices, authentication of the one or more users, one or more changes to a flight plan, and the classes can be criteria of how to interpret and implement the one or more changes to the flight plan based on authentication of the users and other security rules and/or protocols.

A Support Vector Machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

One or more aspects can employ classifiers that are explicitly trained (e.g., through a generic training data) as well as classifiers that are implicitly trained. For example, SVM's can be configured through a learning or training phase within a classifier constructor and feature selection module. Thus, a classifier(s) can be used to automatically learn and perform a number of functions, including but not limited to determining according to a predetermined criteria how to implement changes at a navigation system when the changes are based on information received from one or more remote devices, taking into consideration conflicts between changes at different remote devices, and so on.

Additionally, or alternatively, an implementation scheme (e.g., a rule, a policy, and so on) can be applied to control and/or regulate one or more changes to an active flight plan. In some implementations, based upon a predefined criterion, the rules-based implementation can automatically and/or dynamically implement the changes, request confirmation of the intended change, or refuse to implement the change. In response thereto, the rule-based implementation can automatically interpret and carry out functions associated with the route planning and navigation based on a cost-benefit analysis and/or a risk analysis by employing a predefined and/or programmed rule(s) based upon any desired criteria.

Methods that can be implemented in accordance with the disclosed subject matter, will be better appreciated with reference to the following flow charts and/or the above routing diagrams. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks are required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram. According to some implementations, the methods can be performed by a system comprising a processor. Additionally, or alternatively, the method can be performed by a machine-readable storage medium and/or a non-transitory computer-readable medium, comprising executable instructions that, when executed by a processor, facilitate performance of the methods.

Figure 6:
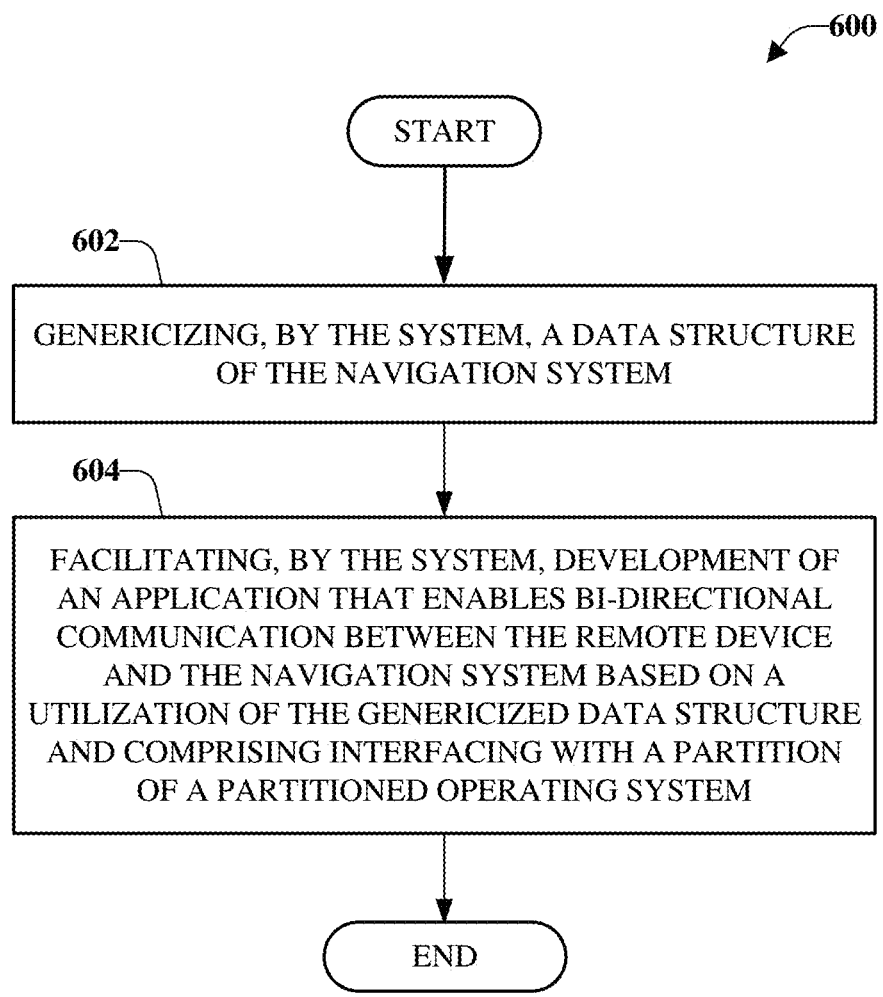
FIG. 6 illustrates a flow diagram of an example, non-limiting, computer-implemented method for facilitating an open interface to a navigation system in accordance with one or more embodiments described herein.

FIG. 6 illustrates a flow diagram of an example, non-limiting, computer-implemented method 600 for facilitating an open interface to a navigation system in accordance with one or more embodiments described herein. Repetitive description of like elements employed in other embodiments described herein is omitted for sake of brevity.

In some implementations, a system comprising a processor can perform the computer-implemented method 600 and/or other methods discussed herein. In other implementations, a device comprising a processor can perform the computer-implemented method 600 and/or other methods discussed herein. In other implementations, a machine-readable storage medium, can comprise executable instructions that, when executed by a processor, facilitate performance of operations, which can be the operations discussed with respect to the computer-implemented method 600 and/or other methods discussed herein. In further implementations, a computer readable storage device comprising executable instructions that, in response to execution, cause a system comprising a processor to perform operations, which can be operations discussed with respect to the computer-implemented method 600 and/or other methods discussed herein.

At 602 of the computer-implemented method 600, a naming of a data structure of a navigation system can be genericized (e.g., via the integration component 104). Genericizing the naming of the data structure can facilitate the bi-directional communication. For example, by genericizing the naming of data structures, devices that utilize different computing languages can be enabled to communicate with the navigation system. Further by genericizing the naming, an entity (e.g., a developer entity) does not need intrinsic domain knowledge of the navigation system data structures and/or methodologies. In an example, the naming of data structures can be specific to a particular FMS implementation, which can be abstracted by the SDK. The SDK can also be available in a multi-platform environment (e.g., using a programming language, such as C++) that can be integrated in different programming environments.

Further, at 604 of the computer-implemented method 600, development of an application that enables the bi-directional communication between the remote device and the navigation system can be facilitated (e.g., via the security component 106). Thereafter, the bi-directional communication between a remote device and a navigation system can be enabled (e.g., via the communication component 108). The remote device can be a portable electronic device external to the navigation system. Enabling the bi-directional communication can be based on a utilization of the data structure naming that has been genericized and can comprise interfacing with a partition of the navigation system. The partition of the navigation system can be a single partition of a partition environment that comprises a plurality of partitions. According to some implementations, the partition of the navigation system can comprise a partition memory that is independent of respective partition memories of the plurality of partitions.

In an example, the method can also comprise authenticating the remote device prior to implementing the bi-directional communication. In another example, the method can comprise sending one or more requests to the navigation system. The one or more requests can comprise an edit request, a query request, or combinations thereof. The edit request can comprise one or more optimizations to a trajectory of the aircraft or other vehicle. In another example, the edit request can comprise a modification to data of a flight plan stored by the navigation system. Further to this example, the flight plan can comprise information for prediction of a four-dimensional trajectory of an aircraft. The query request can comprise a request for an on-demand performance calculation of an aircraft. In another example, the query request can comprise a look-up (or search) of data in a database stored within the navigation system. According to some implementations, the query request can comprise a request for a trajectory determination for a flight plan segment (or more than one flight plan segment) associated with an aircraft.

Figure 7:
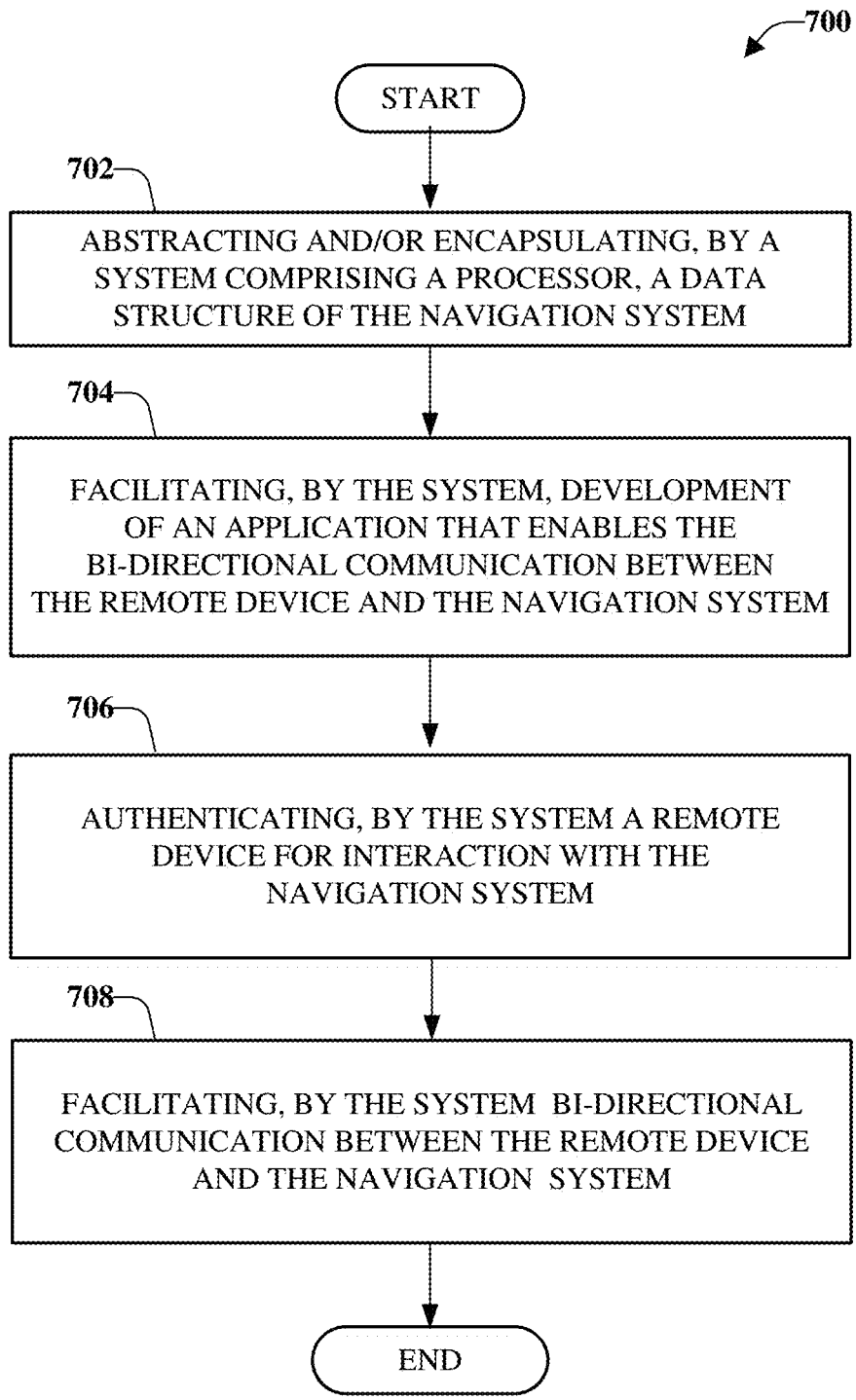
FIG. 7 illustrates a flow diagram of an example, non-limiting, computer-implemented method authenticating one or more devices for interaction with a navigation system in accordance with one or more embodiments described herein.

FIG. 7 illustrates a flow diagram of an example, non-limiting, computer-implemented method 700 authenticating one or more devices for interaction with a navigation system in accordance with one or more embodiments described herein. Repetitive description of like elements employed in other embodiments described herein is omitted for sake of brevity.

The computer-implemented method 700 starts, at 702, when a data structure of the navigation system can be abstracted and/or encapsulated such that specific details related to the data structure are not necessary for communication as discussed herein (e.g., via the integration component 104).

At 704, development of an application that enables bi-directional communication between a remote device and the navigation system can be facilitated (e.g., via the security component 106). The development of the application can be based on a utilization of the data structure abstracted and/or encapsulated. Further, development of the application can comprise interfacing with a partition of the navigation system. The partition of the navigation system can be selected from a multitude of partitions and can be segregated from the other non-selected partitions of the multitude of partitions.

Further, at 706, a remote device (or more than one remote device) can be authenticated (e.g., via the security component 106 or the verification component 402). For example, the authentication of the remote device can relate to the device being previously identified as a device authorized to receive data from, and send data to, a navigation system. In another example, the user of the device can be authenticated based one or more prompts which have been successfully answered (e.g., via the interface component 204). In accordance with some implementations, a flight crew, for example, can actively enable (e.g., through physical interaction with) the navigation system to accept incoming communication from the remote device.

In accordance with some implementations, the authentication does not simply authenticate the remote device (e.g., that a message came from the EFB). Instead, there could be malware running on the remote device that is attempting to communicate with the navigation system. The authentication can happen through use of the SDK (e.g., via the security component 106 or the verification component 402), which can add the necessary information to the communication in order for the navigation system to ensure the message was received from an authenticated application on the remote device. For example, the malware could attack and/or hijack the application (e.g., the SDK) and piggyback through the application and attempt to communicate with the navigation system. Accordingly, the authentication, at 706, can help prevent the occurrence of such an attempt.

According to some implementations, interaction with the navigation system can be established only with trusted devices and/or trusted software, which can be executing on one or more trusted devices. For example, the trusted devices can be devices associated with one or more members of a flight crew or other trusted individuals. According to an implementation, the one or more trusted devices can be devices that have previously interacted with the navigation system or can be new devices. In the case of a new device, one or more security protocols can be initiated and carried out with the device in order to facilitate the authentication. For example, one or more security questions or prompts can be output at the device, the response to which can be utilized to determine if the device is associated with an authorized user. According to some implementations, one or more security protocols can be initiated and carried out with a device that has previously interacted with the navigation system in order to ensure the device is still associated with an authorized user.

Bi-directional communication between the remote device and the navigation system can be facilitated, at 708 (e.g., via the communication component 108). For example, the bi-directional communication can allow the device and the navigation system to engage in a back-and-forth dialog. As such, the navigation system and/or the remote device can initiate the dialog and/or response to a request received from the other device (e.g., the navigation system, a remote device).

Figure 8:
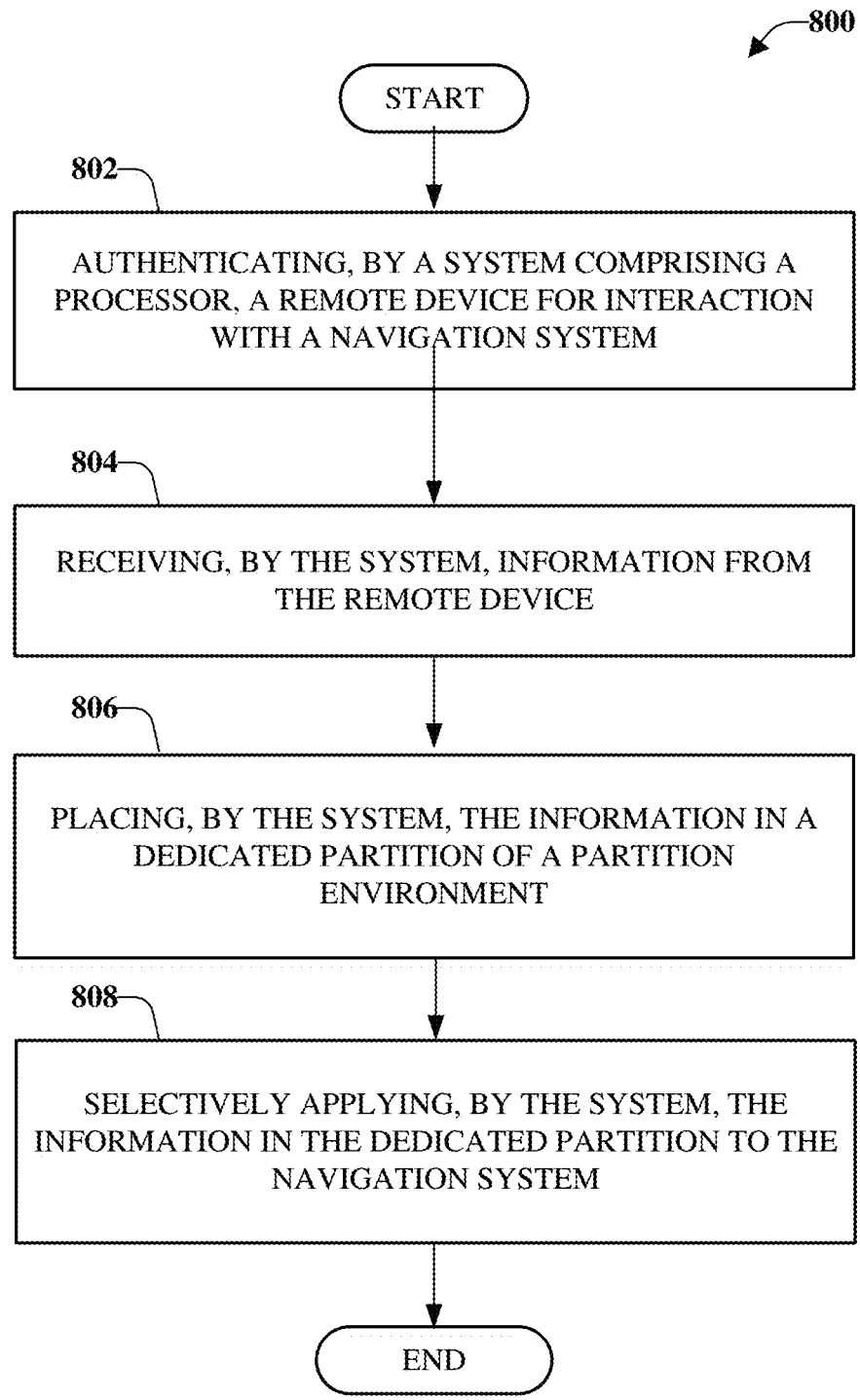
FIG. 8 illustrates a flow diagram of an example, non-limiting, computer-implemented method for segregating information received from one or more remote devices prior to applying the information to a navigation system in accordance with one or more embodiments described herein.

FIG. 8 illustrates a flow diagram of an example, non-limiting, computer-implemented method 800 for segregating information received from one or more remote devices prior to applying the information to a navigation system in accordance with one or more embodiments described herein. Repetitive description of like elements employed in other embodiments described herein is omitted for sake of brevity.

A remote device and/or a user of a remote device can be authenticated, at 802 of the computer-implemented method 800 (e.g., via the security component 106 and/or the verification component 402). Authentication can include various types of authentication techniques and methods (e.g., exchange of keys, and so on). Further, at 804 of the computer-implemented method 800 information can be received from at least one device, such as the remote device 116 (e.g., via the communication component 108). The information received can be related to a flight plan or other operational parameters of an aircraft.

Upon or after receipt of the information, the information can be placed in at least one dedicated partition of a partition environment, at 806 of the computer-implemented method (e.g., via the partition environment 120). By placing the information in the dedicated partition, the information can be segregated and not affect the navigation system.

At 808 of the computer-implemented method 800, the information in the dedicated partition can be selectively applied to the navigation system (e.g., via the verification component 402 and/or the overlay component 404). For example, one or more authenticated entities (e.g., through their respective devices) can verify the information and provide an indication that the information is accepted and can be applied to the navigation system.

Figure 9:
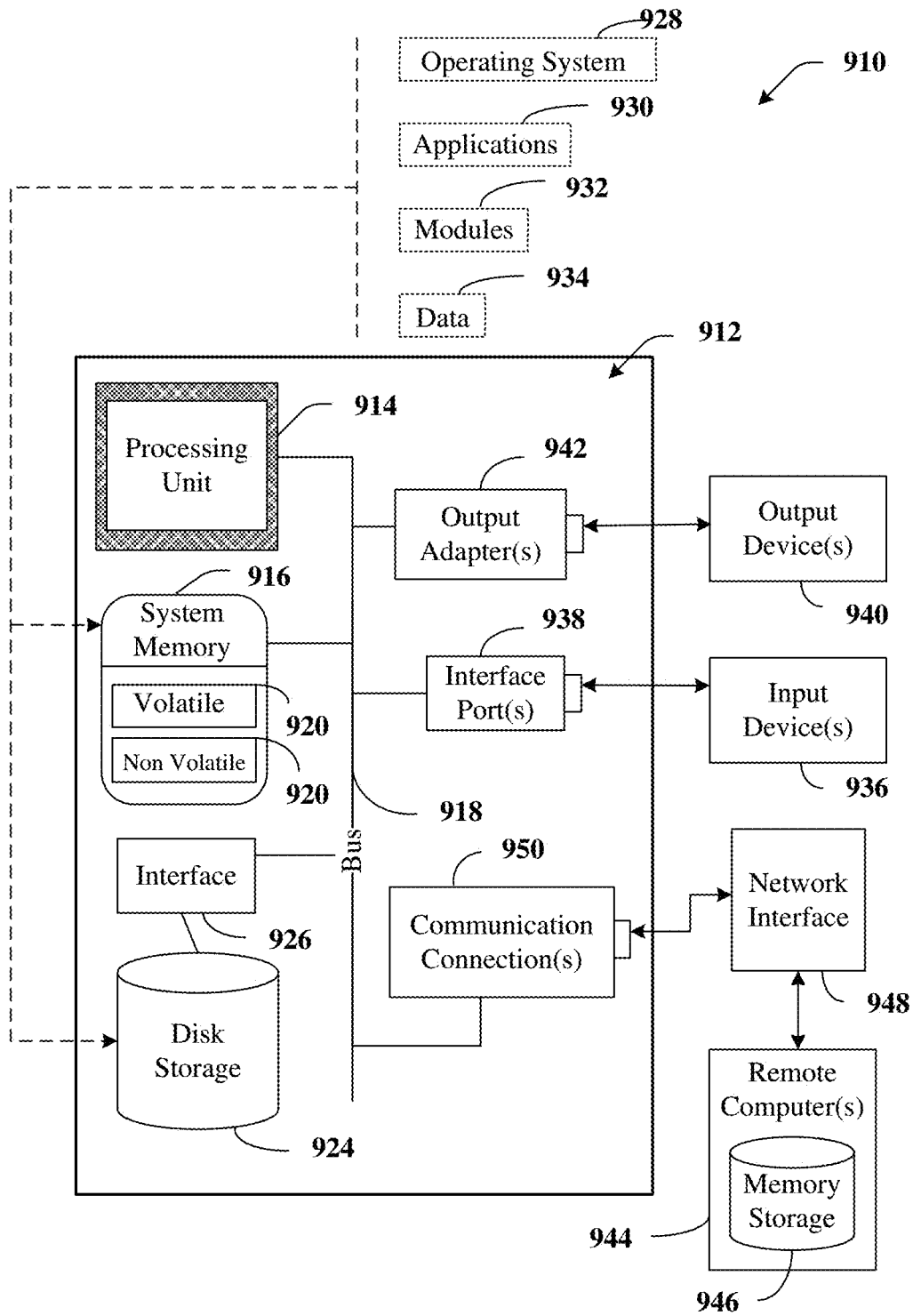
FIG. 9 illustrates an example, non-limiting, computing environment in which one or more embodiments described herein can be facilitated.
Figure 10:
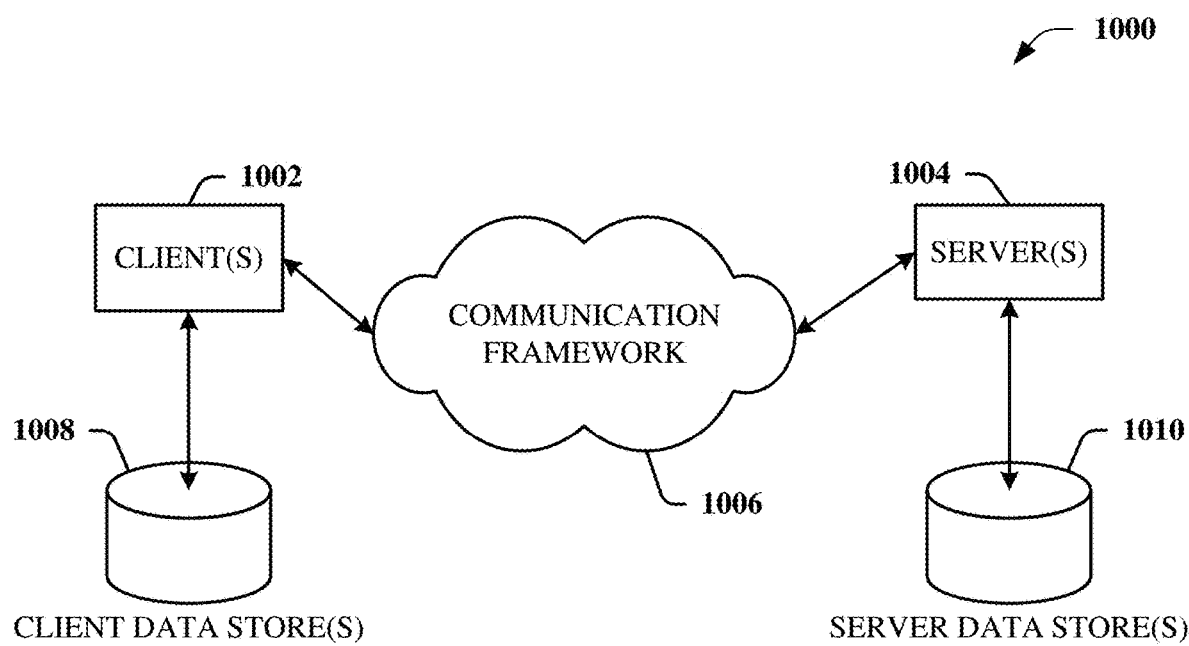
FIG. 10 illustrates an example, non-limiting, networking environment in which one or more embodiments described herein can be facilitated.

In order to provide a context for the various aspects of the disclosed subject matter, FIGS. 9 and 10 as well as the following discussion are intended to provide a brief, general description of a suitable environment in which the various aspects of the disclosed subject matter can be implemented.

With reference to FIG. 9, an example environment 910 for implementing various aspects of the aforementioned subject matter includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Multi-core microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 8-bit bus, ARINC 429, ARINC 664, Industrial Standard Architecture (ISA), Micro-Channel Architecture (MSA), Extended ISA (EISA), Intelligent Drive Electronics (IDE), Video Electronics Standards Association (VESA) Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The Basic Input/Output System (BIOS), containing the basic routines to transfer information between elements within the computer 912, such as during start-up, is stored in nonvolatile memory 922. It should be appreciated that data store components (e.g., memories) described herein can be either volatile memory or nonvolatile memory, or can include both volatile and nonvolatile memory. By way of example and not limitation, nonvolatile memory can include Read Only Memory (ROM), Programmable ROM (PROM), Electrically Programmable ROM (EPROM), Electrically Erasable ROM (EEPROM), or flash memory. Volatile memory 920 includes Random Access Memory (RAM), which acts as external cache memory. By way of example and not limitation, RAM is available in many forms such as Synchronous RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DRRAM). Memory of the disclosed aspects are intended to comprise, without being limited to, these and other suitable types of memory.

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a Compact Disk ROM device (CD-ROM), CD Recordable Drive (CD-R Drive), CD Rewritable Drive (CD-RW Drive) or a Digital Versatile Disk ROM (DVD-ROM) drive. To facilitate connection of the disk storage 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer 912. System applications 930 take advantage of the management of resources by operating system 928 through program modules 932 and program data 934 stored either in system memory 916 or on disk storage 924. It is to be appreciated that one or more embodiments of the subject disclosure can be implemented with various operating systems or combinations of operating systems.

A user enters commands or information into the computer 912 through input device(s) 936. Input devices 936 include, but are not limited to, a pointing device such as a mouse, trackball, stylus, touchpad, keyboard, microphone, joystick, a Cursor Control Device (CCD), game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a Universal Serial Bus (USB). Output device(s) 940 use some of the same type of ports as input device(s) 936. Thus, for example, a USB port can be used to provide input to computer 912, and to output information from computer 912 to an output device 940. Output adapters 942 are provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as Local Area Networks (LAN) and Wide Area Networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the system bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample computing environment 1000 with which the disclosed subject matter can interact. The sample computing environment 1000 includes one or more client(s) 1002. The client(s) 1002 can be hardware and/or software (e.g., threads, processes, computing devices). The sample computing environment 1000 also includes one or more server(s) 1004. The server(s) 1004 can also be hardware and/or software (e.g., threads, processes, computing devices). The servers 1004 can house threads to perform transformations by employing one or more embodiments as described herein, for example. One possible communication between a client 1002 and servers 1004 can be in the form of a data packet adapted to be transmitted between two or more computer processes. The sample computing environment 1000 includes a communication framework 1006 that can be employed to facilitate communications between the client(s) 1002 and the server(s) 1004. The client(s) 1002 are operably connected to one or more client data store(s) 1008 that can be employed to store information local to the client(s) 1002. Similarly, the server(s) 1004 are operably connected to one or more server data store(s) 1010 that can be employed to store information local to the servers 1004.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," "manager," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., Compact Disc (CD), a Digital Video Disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

We claim:
1. A system, comprising:
at least one memory that stores executable components; and
at least one processor, operatively coupled to the at least one memory, that executes the executable components, wherein the executable components comprise:
an integration component that genericizes a naming of a data structure of a navigation system, wherein a data structure naming genericized by the integration component allows remote devices that utilize different computing languages to communicate with the navigation system;

a security component that facilitates enablement of an application that supports bi-directional communication between at least one remote device of the remote devices and the navigation system; and a communication component that facilitates the bi-directional communication between the at least one remote device and the navigation system, wherein the security component utilizes the data structure naming genericized by the integration component, wherein the security component interfaces with a developer component integrated within a partition of a partitioned operating system of the navigation system, wherein the partitioned operating system comprises a group of partitions, including the partition, wherein partitions of the group of partitions comprise respective independent memory structures, and wherein the at least one remote device is a portable electronic device external to the navigation system.

2. The system of claim 1, wherein the partition is a single partition of a partition environment that comprises a plurality of partitions, and wherein the partition provides connectivity between the navigation system and the portable electronic device.

3. The system of claim 2, wherein the partition of the navigation system comprises a partition memory that is independent of respective partition memories of the plurality of partitions.

4. The system of claim 1, wherein the security component authenticates the at least one remote device prior to implementing the bi-directional communication, and wherein the security component is implemented as a software development kit.

5. The system of claim 1, wherein the communication component facilitates sending one or more requests to the navigation system.

6. The system of claim 5, wherein the one or more requests comprise at least an edit request that comprises a modification to data of a flight plan stored by the navigation system, and wherein the flight plan comprises information for prediction of a four-dimensional trajectory of an aircraft.

7. The system of claim 5, wherein the one or more requests comprise at least a query request, wherein the query request comprises a request for an on-demand performance calculation of an aircraft.

8. The system of claim 5, wherein the one or more requests comprise at least a query request, wherein the query request comprises a request for a trajectory determination for a flight plan segment associated with an aircraft.

9. The system of claim 5, wherein the one or more requests comprise at least a query request, wherein the query request comprises a search for data in a database stored within the navigation system.

10. The system of claim 1, wherein the navigation system is associated with an aircraft, and wherein the at least one remote device is located on the ground while the aircraft is in flight.

11. A method, comprising:

genericizing, by a system comprising a processor, a naming of a data structure of a navigation system, wherein the genericizing facilitates a communication between a remote device and the navigation system irrespective of a computing language utilized by the remote device; and facilitating, by the system, development of an application that enables bi-directional communication between the remote device and the navigation system based on a utilization of the data structure naming genericized and comprising interfacing with a first partition of the navigation system, wherein the navigation system comprises at least a second partition, wherein the first partition operates independent of at least the second partition.

12. The method of claim 11, further comprising:
authenticating, by the system, the remote device prior to implementation of the bi-directional communication between the remote device and the navigation system.

13. The method of claim 11, further comprising:
sending, by the system, one or more requests to the navigation system, wherein the one or more requests comprise an edit request, a query request, or combinations thereof.

14. The method of claim 13, wherein the edit request comprises a modification to data of a flight plan stored by the navigation system, and wherein the flight plan comprises information for prediction of a four-dimensional trajectory of an aircraft.

15. The method of claim 11, wherein the first partition is a single partition of a partition environment that comprises a plurality of partitions, including the first partition and at least the second partition, and wherein the first partition facilitates connectivity between the navigation system and the remote device.

16. The method of claim 15, wherein the first partition of the navigation system comprises a partition memory that is independent of respective partition memories of the plurality of partitions.

17. A non-transitory computer readable device comprising executable instructions that, in response to execution, cause a system comprising a processor to perform operations, the operations comprising:

genericizing a naming of a data structure of a navigation system, wherein the genericizing facilitates a communication between a remote device and the navigation system irrespective of a computing language utilized by the remote device; and developing an application that enables bi-directional communication between the remote device and the navigation system based on a utilization of the data structure naming genericized and comprising interfacing with a first partition of the navigation system, wherein the navigation system comprises at least a second partition, and wherein the first partition operates independent of at least the second partition.

18. The non-transitory computer readable device of claim 17, wherein the operations further comprise:
authenticating the remote device prior to implementation of the bi-directional communication between the remote device and the navigation system.

19. The non-transitory computer readable device of claim 17, wherein the operations further comprise:
sending one or more requests to the navigation system, wherein the one or more requests comprise an edit request, a query request, or combinations thereof, wherein the edit request comprises a modification to data of a flight plan stored by the navigation system, and wherein the flight plan comprises information for prediction of a four-dimensional trajectory of an aircraft.

20. The non-transitory computer readable device of claim 17, wherein the first partition is a single partition of a partition environment that comprises a plurality of partitions, including the first partition and at least the second partition, wherein the first partition facilitates connectivity between the navigation system and the remote device and comprises a partition memory that is independent of respective partition memories of the plurality of partitions.

\* \* \* \* \*